United States Patent
Kolb

(10) Patent No.: US 9,849,816 B2
(45) Date of Patent: Dec. 26, 2017

(54) VEHICLE SEAT AND MOTOR VEHICLE OR UTILITY MOTOR VEHICLE

(71) Applicant: GRAMMER AG, Amberg (DE)

(72) Inventor: Jens Kolb, Konigstein (DE)

(73) Assignee: GRAMMER AG, Amberg (DE)

( * ) Notice: Subject to any disclaimer, the term of this patent is extended or adjusted under 35 U.S.C. 154(b) by 427 days.

(21) Appl. No.: 14/278,098

(22) Filed: May 15, 2014

(65) Prior Publication Data

US 2014/0354027 A1 Dec. 4, 2014

(30) Foreign Application Priority Data

Jun. 4, 2013 (DE) .................. 10 2013 105 720
Sep. 19, 2013 (DE) .................. 10 2013 110 370

(51) Int. Cl.
*B60N 2/52* (2006.01)
*B60N 2/54* (2006.01)
(Continued)

(52) U.S. Cl.
CPC ............ *B60N 2/52* (2013.01); *B60N 2/4214* (2013.01); *B60N 2/501* (2013.01); *B60N 2/502* (2013.01);
(Continued)

(58) Field of Classification Search
CPC .......... B60N 2/52; B60N 2/544; B60N 2/525; B60N 2/502; B60N 2/4214; B60N 2/54;
(Continued)

(56) References Cited

U.S. PATENT DOCUMENTS 1,908,902 A 5/1933 Knoll
2,346,895 A * 4/1944 Bergman ............ B60N 2/4214
297/216.18

(Continued)

FOREIGN PATENT DOCUMENTS

CH 138281 2/1930
CN 101337518 1/2009
(Continued)

OTHER PUBLICATIONS

Extended European Search Report for European Patent Application No. 14180567.1, dated Feb. 19, 2015, 9 pages.
(Continued)

*Primary Examiner* — David E Allred
(74) *Attorney, Agent, or Firm* — Sheridan Ross PC

(57) ABSTRACT

A vehicle seat comprising a seat part extending in the vehicle longitudinal direction (X) and in the vehicle transverse direction (Y) and including a backrest part is provided. The vehicle seat includes a seat substructure for suspending and/or damping at least the seat part with respect to the body of a vehicle. The seat substructure comprises at least one horizontal suspension device that includes a body-side lower part and a seat-part-side upper part displaceable with respect thereto. A coupling device is arranged interactively between the seat-part-side upper part and the body-side lower part, and includes a deformable suspension element as a first coupling element and a bearing and deformation device as a further coupling element.

18 Claims, 13 Drawing Sheets

(51) Int. Cl.
*F16F 13/00* (2006.01)
*B60N 2/50* (2006.01)
*B60N 2/42* (2006.01)
*B60N 2/02* (2006.01)

(52) U.S. Cl.
CPC ............ *B60N 2/509* (2013.01); *B60N 2/522* (2013.01); *B60N 2/525* (2013.01); *B60N 2/54* (2013.01); *B60N 2/544* (2013.01); *F16F 13/002* (2013.01); *B60N 2002/0212* (2013.01); *B60N 2002/0216* (2013.01)

(58) Field of Classification Search
CPC ........ B60N 2/522; B60N 2/509; B60N 2/501; B60N 2202/0216; B60N 2002/0212; F16F 13/002
USPC ..................................................... 297/216.18
See application file for complete search history.

(56) References Cited

U.S. PATENT DOCUMENTS

| | | | |
|---|---|---|---|
| 2,660,222 A * | 11/1953 | Woodsworth | B60N 2/4221 |
| | | | 180/274 |
| 2,725,078 A | 11/1955 | Glancy | |
| 3,148,869 A | 9/1964 | Peterson | |
| 3,269,774 A * | 8/1966 | Friedhelm | B60N 2/4214 |
| | | | 267/70 |
| 3,470,692 A | 10/1969 | Kamp | |
| 3,480,293 A | 11/1969 | Vogel et al. | |
| 3,596,895 A | 8/1971 | Hirtreiter | |
| 3,732,944 A | 5/1973 | Kendall | |
| 3,806,191 A * | 4/1974 | Stegmaier | B60N 2/42709 |
| | | | 188/268 |
| 3,938,770 A | 2/1976 | Turner et al. | |
| 4,087,069 A | 5/1978 | Hall et al. | |
| 4,139,186 A | 2/1979 | Postema et al. | |
| 4,418,955 A | 12/1983 | Muncke et al. | |
| 4,497,078 A | 2/1985 | Vogel et al. | |
| 4,502,673 A | 3/1985 | Clark | |
| 4,526,258 A | 7/1985 | Huber | |
| 4,531,761 A | 7/1985 | von Sivers | |
| 4,655,440 A | 4/1987 | Eckert | |
| 4,733,847 A | 3/1988 | Grassl | |
| 4,743,000 A | 5/1988 | Karnopp | |
| 4,936,423 A | 6/1990 | Karnopp | |
| 5,169,112 A | 12/1992 | Boyles et al. | |
| 5,222,759 A | 6/1993 | Wanner et al. | |
| 5,263,559 A | 11/1993 | Mettner | |
| 5,273,240 A | 12/1993 | Sharon | |
| 5,290,089 A | 3/1994 | Oleszko et al. | |
| 5,294,085 A | 3/1994 | Llloyd et al. | |
| 5,538,117 A | 7/1996 | Bouchez | |
| 5,685,603 A * | 11/1997 | Lane, Jr. | B60N 2/2821 |
| | | | 297/216.11 |
| 5,836,647 A * | 11/1998 | Turman | B60N 2/4228 |
| | | | 248/548 |
| 5,871,257 A | 2/1999 | Dundes, Sr. | |
| 5,876,085 A | 3/1999 | Hill | |
| 6,120,082 A | 9/2000 | Vandermolen | |
| 6,467,748 B1 | 10/2002 | Schick et al. | |
| 6,494,441 B2 | 12/2002 | Beck et al. | |
| 6,857,674 B2 | 2/2005 | Chareyre | |
| 7,246,836 B2 | 7/2007 | Hahn | |
| 7,290,834 B2 | 11/2007 | Christopher | |
| 7,341,645 B2 | 3/2008 | Fong | |
| 7,568,675 B2 | 8/2009 | Catton | |
| 7,635,051 B2 | 12/2009 | Beck | |
| 7,699,147 B2 | 4/2010 | Preukschat et al. | |
| 7,779,974 B2 | 8/2010 | Timoney et al. | |
| 8,091,964 B2 | 1/2012 | Carter et al. | |
| 8,112,198 B2 * | 2/2012 | Parison, Jr. | B60N 2/501 |
| | | | 701/37 |
| 8,118,287 B2 | 2/2012 | Schordine | |
| 8,146,897 B2 | 4/2012 | Beck | |
| 8,256,842 B2 | 9/2012 | Himmelhuber et al. | |
| 8,342,541 B2 | 1/2013 | Wurmthaler et al. | |
| 8,439,420 B2 | 5/2013 | Cantor et al. | |
| 8,585,004 B1 | 11/2013 | Roeglin | |
| 8,632,061 B2 | 1/2014 | Nemoto | |
| 8,776,961 B2 | 7/2014 | Mod et al. | |
| 8,820,064 B2 | 9/2014 | Six et al. | |
| 8,998,325 B2 * | 4/2015 | Jonsson | B60N 2/42727 |
| | | | 297/216.15 |
| 9,140,328 B2 | 6/2015 | Lorey | |
| 9,120,410 B2 | 9/2015 | Bauman | |
| 9,260,011 B2 | 2/2016 | Anderson et al. | |
| 9,266,453 B2 * | 2/2016 | Haller | B60N 2/527 |
| 9,377,074 B2 * | 6/2016 | Lorey | F16F 9/0218 |
| 9,481,221 B2 | 11/2016 | Reybrouck | |
| 9,597,939 B2 | 3/2017 | Anderson et al. | |
| 2001/0015565 A1 | 8/2001 | Motozawa et al. | |
| 2001/0033047 A1 | 10/2001 | Beck et al. | |
| 2002/0145315 A1 | 10/2002 | Fraley et al. | |
| 2004/0112659 A1 | 6/2004 | Kramer et al. | |
| 2004/0251097 A1 | 12/2004 | Barbison et al. | |
| 2006/0237885 A1 | 10/2006 | Paillard et al. | |
| 2007/0035167 A1 | 2/2007 | Meyer | |
| 2007/0084687 A1 | 4/2007 | Foster et al. | |
| 2007/0278377 A1 | 12/2007 | Moorhouse et al. | |
| 2008/0156602 A1 | 7/2008 | Hiemenz et al. | |
| 2009/0015051 A1 | 1/2009 | Haeberle | |
| 2009/0134595 A1 * | 5/2009 | Haller | B60G 17/0155 |
| | | | 280/124.157 |
| 2009/0179390 A1 * | 7/2009 | Wurmthaler | B60N 2/501 |
| | | | 280/5.519 |
| 2009/0218867 A1 | 9/2009 | Clark | |
| 2010/0072760 A1 | 3/2010 | Anderson et al. | |
| 2010/0117411 A1 | 5/2010 | Fujita et al. | |
| 2010/0181708 A1 * | 7/2010 | Kolb | B60G 17/0416 |
| | | | 267/113 |
| 2010/0276959 A1 | 11/2010 | Jang | |
| 2011/0001342 A1 | 1/2011 | Deml et al. | |
| 2011/0006567 A1 | 1/2011 | Mullen | |
| 2011/0018316 A1 | 1/2011 | Meredith et al. | |
| 2011/0277433 A1 | 11/2011 | Sugden et al. | |
| 2011/0278894 A1 | 11/2011 | Lorey | |
| 2011/0298266 A1 | 12/2011 | Haller | |
| 2012/0007293 A1 | 1/2012 | Baur et al. | |
| 2012/0025577 A1 | 2/2012 | Kolb | |
| 2012/0091679 A1 | 4/2012 | Kashi et al. | |
| 2012/0091773 A1 | 4/2012 | Lorey | |
| 2012/0145875 A1 | 6/2012 | Haller et al. | |
| 2012/0153689 A1 * | 6/2012 | Haller | B60N 2/06 |
| | | | 297/217.1 |
| 2012/0153695 A1 * | 6/2012 | Haller | B60N 2/06 |
| | | | 297/329 |
| 2013/0112839 A1 | 5/2013 | Kato et al. | |
| 2013/0161138 A1 | 6/2013 | Barefoot | |
| 2013/0341484 A1 | 12/2013 | Yamada et al. | |
| 2014/0239684 A1 * | 8/2014 | Mindel | B60N 2/2824 |
| | | | 297/216.18 |
| 2014/0354030 A1 | 12/2014 | Kolb | |
| 2015/0001771 A1 | 1/2015 | Lorey | |
| 2015/0090549 A1 | 4/2015 | Haller | |
| 2015/0165933 A1 | 6/2015 | Kolb | |
| 2016/0059658 A1 | 3/2016 | Kuriki | |
| 2017/0023086 A1 | 1/2017 | Ogawa | |
| 2017/0037921 A1 | 2/2017 | Ogawa | |

FOREIGN PATENT DOCUMENTS

| | | |
|---|---|---|
| CN | 203032435 | 7/2013 |
| DE | 1287453 | 1/1969 |
| DE | 2016973 | 10/1970 |
| DE | 2756624 | 6/1979 |
| DE | 2757661 | 6/1979 |
| DE | 141769 | 5/1980 |
| DE | 2059720 | 6/1980 |
| DE | 3517345 | 11/1986 |
| DE | 3831724 | 3/1990 |
| DE | 3930612 | 3/1991 |

(56) References Cited

FOREIGN PATENT DOCUMENTS

| | | | | |
|---|---|---|---|---|
| DE | 4029490 | 3/1992 | | |
| DE | 4037289 | 5/1992 | | |
| DE | 3686619 | 4/1993 | | |
| DE | 4216987 | 7/1993 | | |
| DE | 3785493 | 10/1993 | | |
| DE | 19938698 | 2/2001 | | |
| DE | 20116588 | 5/2002 | | |
| DE | 10306564 | 8/2004 | | |
| DE | 102004013308 | 12/2005 | | |
| DE | 102005040581 | 3/2006 | | |
| DE | 60116693 | 7/2006 | | |
| DE | 102005011856 | 8/2006 | | |
| DE | 102005048949 | 12/2006 | | |
| DE | 102006016140 | 10/2007 | | |
| DE | 102007039215 | 2/2009 | | |
| DE | 202007013300 | 2/2009 | | |
| DE | 102008016685 | 6/2009 | | |
| DE | 102008022046 B3 * | 7/2009 | ............. | B60N 2/002 |
| DE | 102008020865 | 11/2009 | | |
| DE | 102008027474 | 12/2009 | | |
| DE | 102008050142 | 3/2010 | | |
| DE | 102008037547 | 5/2010 | | |
| DE | 102009022763 | 12/2010 | | |
| DE | 202011005606 | 12/2011 | | |
| DE | 102010033419 | 2/2012 | | |
| DE | 102010037842 | 3/2012 | | |
| DE | 102010051325 | 5/2012 | | |
| DE | 102010055342 | 6/2012 | | |
| DE | 102010055344 | 6/2012 | | |
| DE | 102011009530 | 7/2012 | | |
| DE | 102011100307 | 11/2012 | | |
| DE | 102011085879 | 5/2013 | | |
| EP | 0322608 | 7/1989 | | |
| EP | 1186467 | 3/2002 | | |
| EP | 1447589 | 8/2004 | | |
| EP | 1464866 | 10/2004 | | |
| EP | 1643155 | 4/2006 | | |
| EP | 2468568 | 4/2006 | | |
| EP | 2062758 | 5/2009 | | |
| EP | 2133576 | 12/2009 | | |
| EP | 2211072 A2 * | 7/2010 | ......... | B60G 17/0416 |
| EP | 2465725 A1 * | 6/2012 | ........... | B60G 99/002 |
| EP | 2468567 | 6/2012 | | |
| EP | 2468567 | 6/2013 | | |
| FR | 1081491 | 12/1954 | | |
| FR | 1364719 | 6/2012 | | |
| GB | 1295410 | 11/1972 | | |
| JP | S62-18346 | 1/1987 | | |
| JP | S62-18347 | 1/1987 | | |
| WO | WO 91/04168 | 4/1991 | | |
| WO | WO 9422692 A1 * | 10/1994 | ........... | B60N 2/4214 |
| WO | WO 99/33676 | 7/1999 | | |

OTHER PUBLICATIONS

Notice of Allowance for U.S. Appl. No. 14/276,122, dated Jun. 17, 2015, 9 pages.
Official Action for U.S. Appl. No. 14/294,356, dated Jun. 8, 2015, 15 pages.
Official Action for U.S. Appl. No. 14/294,356, dated Sep. 24, 2015, 17 pages.
Notice of Allowance for U.S. Patent Application No. 14/294,356, dated Nov. 30, 2015, 6 pages.
Official Action for U.S. Appl. No. 14/314,719, dated Sep. 30, 2015, 7 pages.
Official Action for U.S. Appl. No. 14/468,977, dated Jul. 21, 2015, 11 pages.
Official Action for U.S. Appl. No. 14/468,977, dated Dec. 4, 2015, 11 pages.
U.S. Appl. No. 14/915,754, filed Mar. 1, 2016, Haller.
U.S. Appl. No. 15/025,969, filed Mar. 30, 2016, Haller.
U.S. Appl. No. 15/025,986, filed Mar. 30, 2016, Haller.
Notice of Allowance for U.S. Appl. No. 14/314,719, dated Mar. 30, 2016 5 pages.
Notice of Allowance for U.S. Appl. No. 14/468,977, dated Mar. 28, 2016 5 pages.
Official Action (no translation) for CN Patent Application No. 201410784797.9, dated Jan. 4, 2017, 7 pages.
Official Action for U.S. Appl. No. 14/568,374, dated Dec. 30, 2016, 6 pages.
Official Action for U.S. Appl. No. 14/915,754, dated Feb. 2, 2017, 10 pages.
Official Action for U.S. Appl. No. 15/025,986, dated Mar. 20, 2017, 7 pages, Restriction Requirement.
Official Action for U.S. Appl. No. 15/025,986, dated May 31, 2017 11 pages.

* cited by examiner

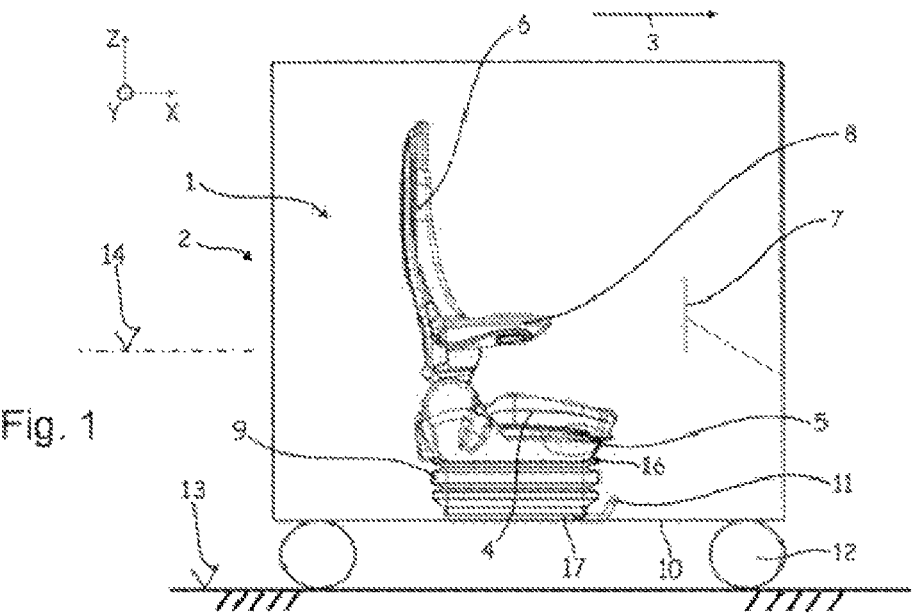
Fig. 1
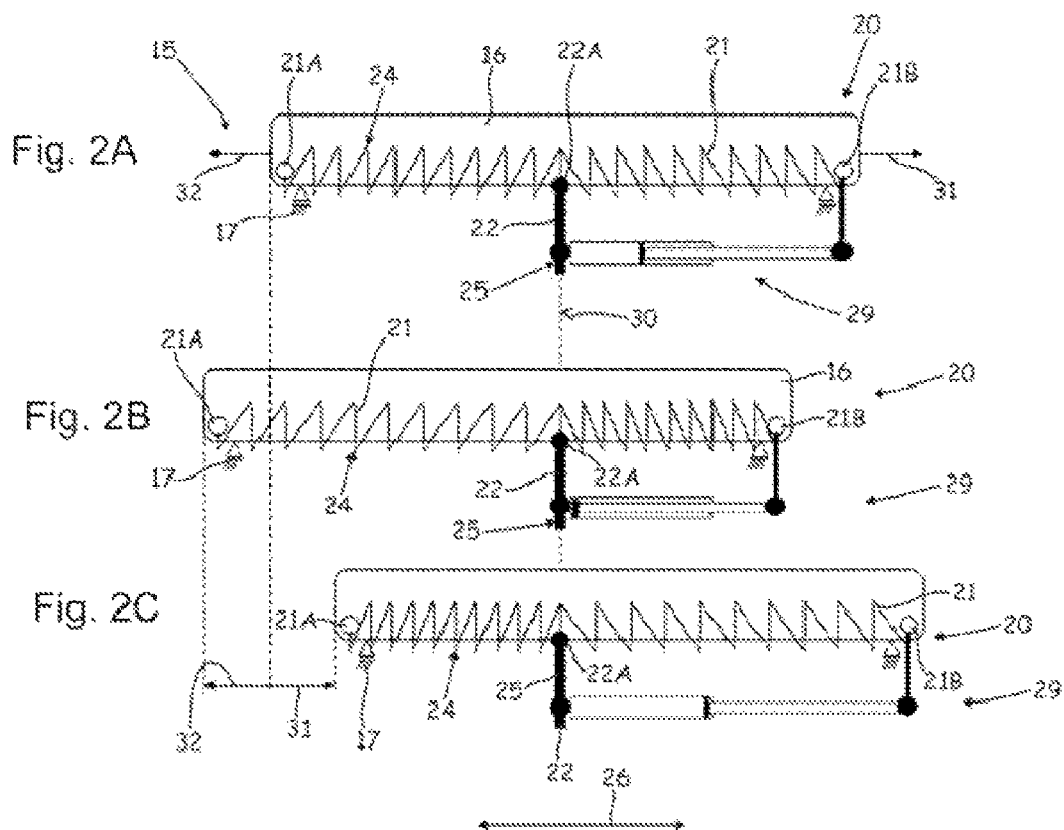
Fig. 2A
Fig. 2B
Fig. 2C

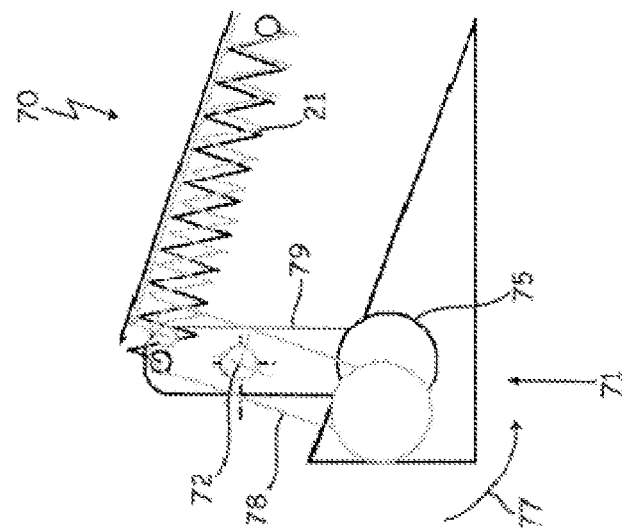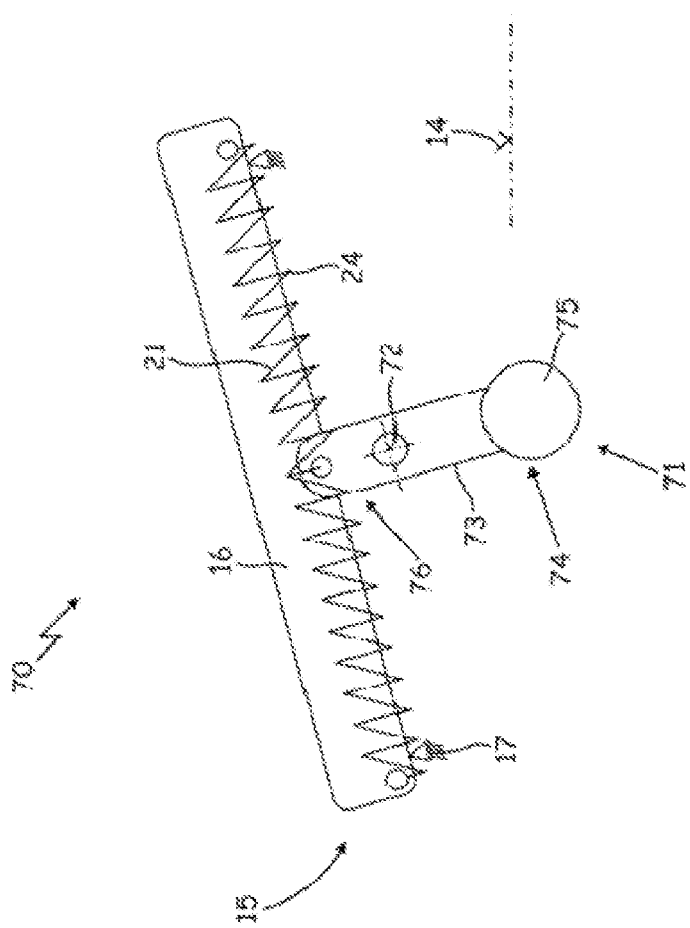
Fig. 3A
Fig. 3B

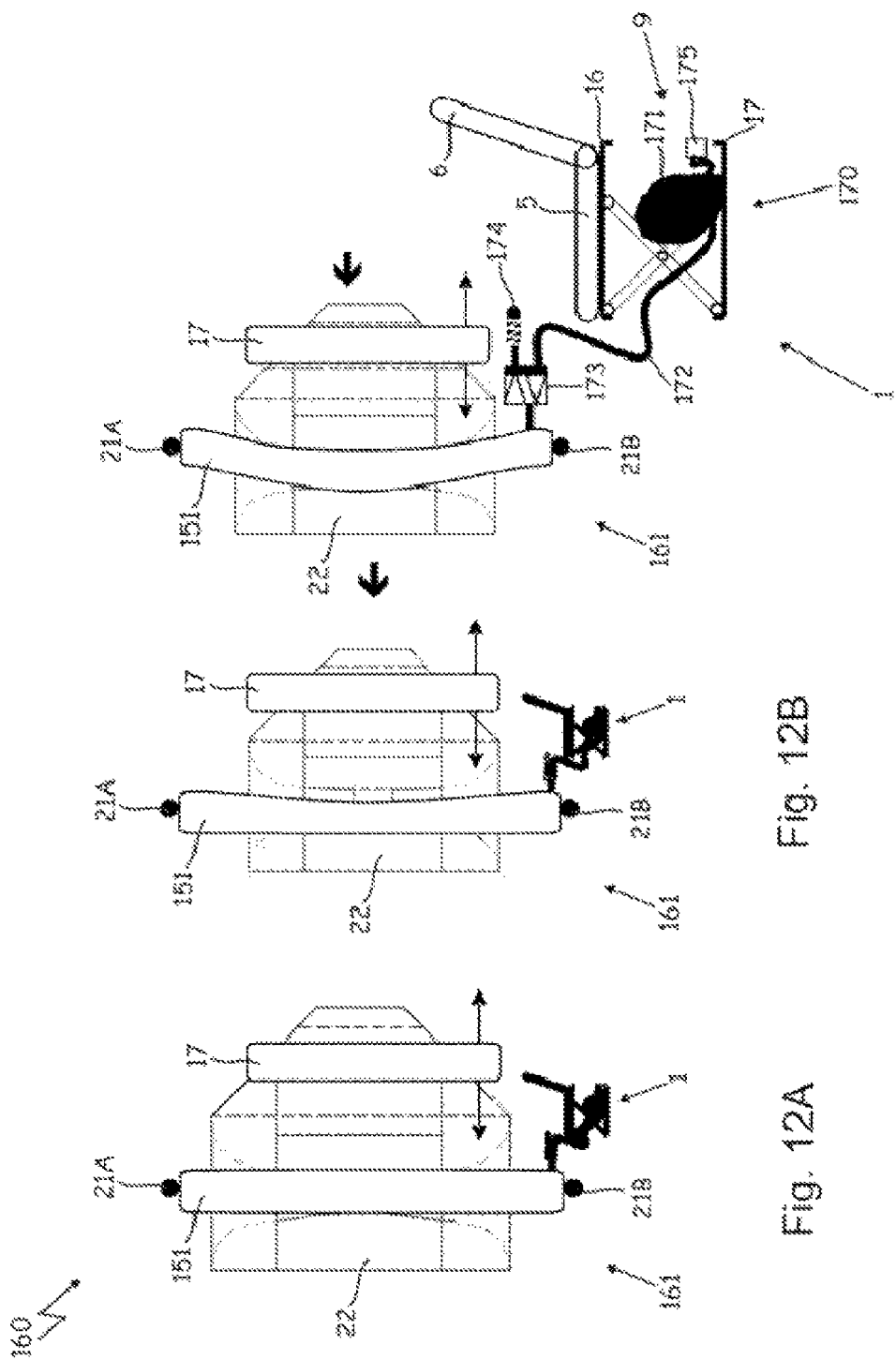

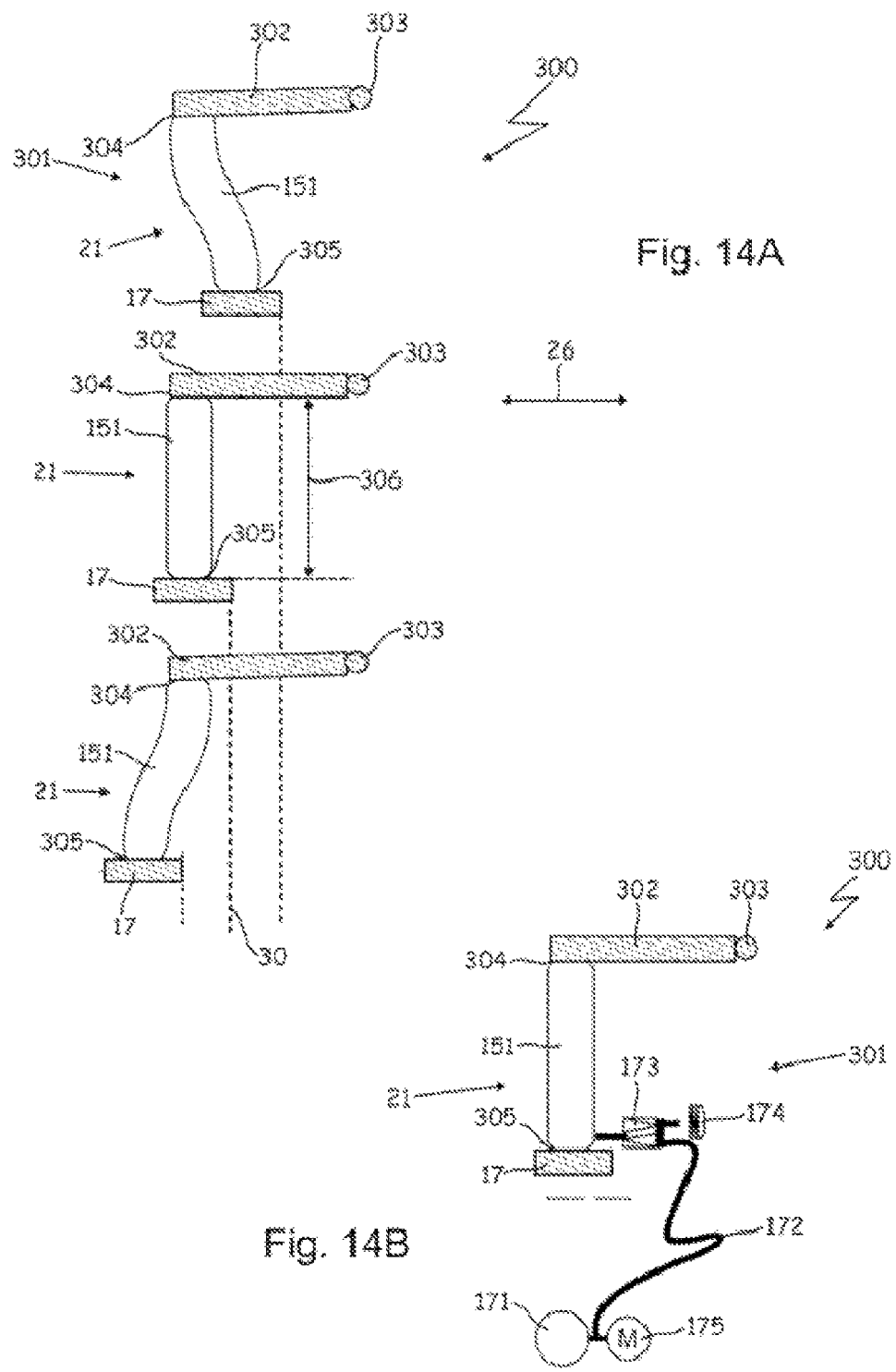

VEHICLE SEAT AND MOTOR VEHICLE OR UTILITY MOTOR VEHICLE

CROSS-REFERENCE TO RELATED APPLICATIONS

This application claims the benefit of German Patent Application No. 10 2013 105 720.9 filed Jun. 4, 2013, and German Patent Application No. 10 2013 110 370.7 filed Sep. 19, 2013, the disclosures of each of which are incorporated herein by reference.

FIELD

The invention relates to a vehicle seat with a coupling device between a body side lower part and a seat part side upper part.

BACKGROUND

The invention further relates to a motor vehicle or a utility motor vehicle comprising a passenger compartment and a vehicle seat arranged therein for receiving a passenger.

Generic vehicle seats have long been known in the art, and are used in particular in off-road motor vehicles or respectively. Utility motor vehicles so as to offer a passenger, in particular a driver, maximum travel comfort even in the event of rough or respectively unmade road conditions.

For this purpose, the vehicle seats comprise both horizontally and vertically acting suspension devices as well as damping devices, by means of which at least the seat part of the vehicle seat is mounted correspondingly well with respect to the body of the vehicle.

Often, because of suspension and/or damping devices which take up a lot of installation space, a seat substructure of this type of the vehicle seat is of a particularly large construction. Thus, horizontal suspension devices known from the art often have excessive space requirements, since they always require the use of suspension elements orientated in the direction to be sprung, such as for example helical suspension elements. However, an arrangement of this type results in the fact that the horizontal suspension device is of a very large construction in the direction to be sprung so as to achieve a particular spring characteristic, or only a correspondingly smaller suspension element can be used respectively. If this latter choice is made, it is often not possible to achieve the desired spring characteristic, or not to a sufficient extent. Further, the spring characteristics in particular of the suspension elements installed in the horizontal suspension devices cannot be changed or respectively influenced, or not to a sufficient extent, meaning that the resulting spring characteristic cannot be set optimally.

The disclosure document DE 10 2010 055 342 A1 discloses a conventional vehicle seat for a vehicle, in particular for an off-road vehicle, which shows in particular a horizontal suspension device, which comprises at least one fluid spring element, which can be actively changed in a receiving volume and extends elongate between two attachment regions and to which compressive forces can be applied, at an inclination to the longitudinal direction thereof, using a deformation device so as to deform, in particular bend, the fluid spring element. By way of the suspension device formed in this manner, in particular a very compactly constructed horizontal suspension device can be integrated into the seat substructure beneath a seat part of the vehicle seat. Especially by way of the fluid spring element used, the spring characteristic can additionally be changed within particular limits, in such a way that the aforementioned drawbacks can be overcome well at least in part.

SUMMARY

The invention relates to a vehicle seat comprising a seat part extending in the vehicle longitudinal direction and in the vehicle transverse direction for receiving a person, comprising a backrest part for supporting the back of the person, and comprising a seat substructure for suspending and/or damping at least the seat part with respect to a body of a vehicle, in which the seat substructure comprises at least one horizontal suspension device for suspending the seat part with respect to the body in the vehicle longitudinal direction and/or in the vehicle transverse direction, the at least one horizontal suspension device comprising a body-side lower part and a seat-part-side upper part displaceable with respect thereto, in which a coupling device is arranged interactively between the seat-part-side upper part and the body-side lower part, the coupling device comprising a deformable suspension element as a first coupling element and a bearing and deformation device as a further coupling element for this purpose, the deformable suspension element being arranged between two mutually facing contact faces of a receiving space of the bearing and deformation device, and the coupling elements each being coupled to the seat-part-side upper part or to the body-side lower part.

The invention further relates to a motor vehicle or a utility motor vehicle comprising a passenger compartment and a vehicle seat arranged therein for receiving a passenger.

The object of the present invention is to develop generic vehicle seats, in particular horizontal suspension devices of generic vehicle seats of this type, in such a way that they have improved functional properties in particular in the vehicle longitudinal direction and/or in the vehicle transverse direction.

The object of the invention is achieved by a vehicle seat comprising a seat part extending in the vehicle longitudinal direction and in the vehicle transverse direction for receiving a person, comprising a backrest part for supporting the back of the person, and comprising a seat substructure for suspending and/or damping at least the seat part with respect to the body of a vehicle, in which the seat substructure comprises at least one horizontal suspension device for suspending the seat part with respect to the body in the vehicle longitudinal direction and/or in the vehicle transverse direction, the at least one horizontal suspension device comprising a body-side lower part and a seat-part-side upper part displaceable with respect thereto, in which a coupling device is arranged interactively between the seat-part-side upper part and the body-side lower part, the coupling device comprising a deformable suspension element as a first coupling element and a bearing and deformation device as a further coupling element for this purpose, the deformable suspension element being arranged between two mutually facing contact faces of a receiving space of the bearing and deformation device, and the coupling elements each being coupled to the seat-part-side upper part or to the body-side lower part, the vehicle seat being distinguished in that the first coupling element is arranged displaceably with respect to and on the seat-part-side upper part or the further coupling element is arranged displaceably with respect to and on the body-side lower part, or vice versa.

Because the coupling elements are each arranged on the seat-part-side upper part or on the body-side lower part, in each case displaceably with respect thereto, a distance of a coupling point between the coupling elements and the seat-part-side upper part and/or the body-side lower part with respect to said upper or respectively lower part can be varied, meaning that a zero position correction as a function of a vehicle inclination angle and a respectively seat part inclination with respect to an imaginary horizontal plane are readily achieved in a constructionally simple manner by the horizontal suspension device.

A zero position correction of this type, having a simple construction and action, has hitherto been unknown. Further, by means of an arrangement of this type, a spring characteristic of the deformable suspension element can additionally be significantly changed readily by comparison with the option known from the art.

Overall, as a result the functionality of the present horizontal suspension device can be expanded and improved enormously by comparison with the previously known horizontal suspension devices.

Within the meaning of the invention, the term "horizontal suspension device" describes a linear horizontal suspension device by means of which in particular the seat-part-side upper part is spring-mounted with respect to the body-side lower part, it being possible for the horizontal suspension device to be damped and undamped. In terms of construction, this is achieved at least in part by way of the coupling device.

Within the meaning of the invention, the term "coupling device" describes any device by means of which the seat-part-side upper part can be mechanically coupled with respect to the body-side lower part in such a way that the seat-part-side upper part and the body-side lower part are arranged displaceably with respect to one another with a horizontal component.

Within the meaning of the invention, the term "seat-part-side upper part" describes a component or assembly on which the seat part is arranged. Optionally, the seat-part-side upper part may readily comprise the seat part of the vehicle seat, making it possible to simplify the construction of the horizontal suspension device further.

Accordingly, the term "body-side lower part" herein describes a component or assembly which is arranged on the body of the vehicle. Optionally, the body-side lower part may readily comprise a sub-region of the body.

Ideally, a fluid suspension element is possible as a deformable suspension element, the fluid suspension element preferably being a pneumatic suspension element.

Depending on the selected variant embodiment of the vehicle seat or the horizontal suspension device thereof, respectively the present suspension element may also be configured as a helical suspension element or else as a rubber suspension element or the like.

The latter suspension elements are advantageous particularly because, by means of the arrangement according to the invention, the characteristics of the helical suspension element or respectively rubber suspension elements can be changed in a highly convenient manner.

Even a relatively large zero position correction with sufficient correction distances is possible, especially if the suspension element is configured as a helical suspension element or respectively rubber suspension element.

Whilst for a fluid spring element the spring characteristic or a respectively zero position correction can be set within narrow limits by way of the corresponding compressive loading of the fluid spring element, this was not possible for a helical suspension element or a respectively rubber suspension element.

It will be appreciated that the bearing and deformation device for bearing and deforming the deformable suspension element can be configured in a wide variety of ways.

In particular, in this context the two mutually facing contact faces may be arranged extending mutually in parallel.

Preferably, the two mutually facing contact faces or at least one of these contact faces are curved, it being possible in particular for them to be curved mirror-symmetrically or asymmetrically with respect to one another about a bearing axis, along which a receiving space for the deformable suspension element extends.

By way of a contact face curved in any manner whatsoever a spring force can be configured progressively towards the spring excursion end in a constructionally simple manner.

Thus, the bearing and deformation direction represents a central engagement point of the suspension element.

This is a suspension design involving a transversely loaded suspension element, such as a helical spring element or the like.

Ideally, the longitudinal extension of the receiving space extends in a transverse manner to the respective horizontal suspension direction, it being possible for the horizontal suspension direction to be orientated for example in the vehicle longitudinal direction or in the vehicle transverse direction.

It will be appreciated that the first coupling element may in this context be arranged on the seat-part-side upper part or the body-side lower part if the further coupling element is accordingly arranged on the body-side lower part or on the seat-part-side upper part respectively.

It will further be appreciated that the coupling elements may each be arranged displaceably both with respect to the seat-part-side upper part and with respect to the body-side lower part. A variant embodiment of this type thus provides that the first coupling element is arranged displaceably with respect to and on the seat-part-side upper part and the further coupling element is arranged displaceably with respect to and on the body-side lower part, or vice versa.

It will thus be appreciated that the first coupling element may be coupled to the seat-part-side upper part and the further coupling element may be coupled to the body-side lower part, or vice versa, if the idea is that the coupling elements are respectively coupled to the seat-part-side upper part or to the body-side lower part. It is thus unimportant whether the zero position correction takes place by way of linear adjustment at the coupling point to the seat-part-side upper part or at the coupling point to the body-side lower part.

A particularly preferred variant of embodiment provides that the coupling device comprises a coupling point position adjustment unit for relatively displacing a coupling point, present between at least one of the coupling elements and the seat-part-side upper part and/or the body-side lower part, with respect to the seat-part-side upper part or the body-side lower part.

Within the meaning of the invention, the term "coupling point" describes the coupling location or respectively coupling region at which the respective coupling element is operatively connected to the seat-part-side upper part and/or the body-side lower part. In this context, the corresponding coupling element may be coupled to the seat-part-side upper part or to the body-side lower part by means of a coupling point or else alternatively by means of two or more advantageous coupling points of this type.

By means of the present coupling point position adjustment unit, it is advantageously possible to vary a coupling distance between the coupling elements and the respective seat-part-side upper part or respectively body-side lower part as required, so as to achieve hereby a desired horizontal zero position correction or spring characteristic alteration.

Thus, in accordance with a further aspect of the invention, it is advantageous for the coupling device to comprise a zero position correction unit for adapting the horizontal zero position of the horizontal suspension device, the first coupling element and the seat-part-side upper part being coupled to one another at a shared upper part coupling point in such a way that the position of the upper part coupling point can be set variably with respect to the seat-part-side upper part.

In addition or alternatively it is advantageous for the coupling device to comprise a zero position correction unit for adapting the horizontal zero position of the horizontal suspension device, the further coupling element and the body-side lower part being coupled to one another at a shared lower part coupling point in such a way that the position of the lower part coupling point can be set variably with respect to the body-side lower part.

By way of the zero position correction unit described herein, it is possible, in a particularly constructionally simple manner, to displace a horizontal suspension device, which has shifted as a result of an inclination of the vehicle from the horizontal zero position, at least in part in such a way that as equal or as respectively large a spring excursion as possible is available on the two sides of the horizontal zero position, in such a way that the risk of striking on an end stop as a result of an insufficient spring excursion is greatly reduced.

In accordance with another aspect of the invention, it is advantageous for the coupling device to comprise a spring characteristic adaptation unit for adapting the spring characteristic of the deformable suspension element, the first coupling element and the seat-part-side upper part being coupled to one another at a shared upper part coupling point in such a way that the position of the upper part coupling point can be set variably with respect to the seat-part-side upper part.

In addition or alternatively, it is advantageous for the coupling device to comprise a spring characteristic adaptation unit for adapting the spring characteristic of the deformable suspension element, the further coupling element and the body-side lower part being coupled to one another at a shared lower part coupling point in such a way that the position of the lower part coupling point can be set variably with respect to the body-side lower part.

By way of a spring characteristic adaptation unit of this type, it is possible in a particularly constructionally simple manner to adapt the spring characteristic to the respective conditions, such as the weight of the passenger, in a particularly large range.

It is further advantageous for the coupling device to comprise a mechanically or pneumatically operating adjustment device for displacing the coupling points with respect to the seat-part-side upper part and/or the body-side lower part. By way of a mechanically or pneumatically operating adjustment device, the coupling point position adjustment unit and in particular the zero position correction unit or respectively the spring characteristic adaptation unit may be implemented in a very constructionally simple manner at least in part.

An adjustment means which operates mechanically or pneumatically in this manner can for example be implemented in a constructionally simple manner by way of an electrically driven linear motor unit or a pneumatic cylinder piston unit.

It will be appreciated that the implementation of the coupling unit does not have to limited to these embodiments, but rather other constructions, by means of which the respective coupling point can be spaced differently with respect to the seat-part-side upper part or respectively the body-side lower part, may also be implemented constructionally. In a configuration of this type corresponding thereto, a hydraulically operating adjustment means may also be provided.

It is further advantageous for one of the coupling elements to comprise a rotary bearing and/or a linear bearing for configuring the respective coupling point.

By means of the rotary bearing between one of the coupling elements and the seat-part-side upper part or the body-side lower part, it is possible, in a constructionally simple manner, for example to provide compensation with respect to a change in length if this coupling element bends, in particular with respect to the deformable suspension element.

By contrast, by means of the linear bearing, advantageous and selective guidance of the coupling point displaced by the coupling point position adjustment unit or respectively the zero position correction unit or spring characteristic adaptation unit is possible, in such a way that the desired effects in terms of a zero position correction or respectively spring characteristic adaptation can be implemented in a particularly selective manner.

For example, the linear bearing is configured as a sliding bearing element, in which a sliding element can be moved in and along a guide groove.

In this context, it is also advantageous if the linear bearing comprises a curved path, a coupling point configured by way of the linear bearing being arranged movably along said path. For example, by way of a slide of a curved or oblique configuration, in particular a further progression possibility on the horizontal suspension device with respect to the deformable suspension element can be achieved, in such a way that a correction path which would otherwise be required can be reduced.

With respect to an alternative variant embodiment, it is advantageous for one of the coupling elements to be arranged on the seat-part-side upper part or on the body-side lower part both in a stationary manner by way of an attachment region and displaceably by means of a coupling point which is displaceable with respect to the seat-part-side upper part or the body-side lower part. This also makes it possible to provide a horizontal suspension device of a very simple and compact construction.

It is further advantageous for the zero position correction unit and/or the spring characteristic adaptation unit to be arranged between one of the coupling elements and the seat-part-side upper part or the body-side lower part in such a way that the respective coupling element is operatively connected to the seat-part-side upper part or the body-side lower part by means of the zero position correction unit or the spring characteristic adaptation unit. In this way, the construction of the coupling device can be configured in a constructionally very simple and compact manner.

In accordance with a further preferred embodiment, it is advantageous for the zero position correction unit and/or the spring characteristic adaptation unit to comprise a frequency selection unit so as to be able to distinguish higher-frequency external excitations from simple inclination impulses.

It is further advantageous for the horizontal suspension device of the vehicle seat to be implemented with preferably just one suspension element in the vehicle longitudinal direction and/or vehicle transverse direction, in particular acting in opposing directions. In this way, an extremely slender horizontal suspension device, in other words one requiring very little installation space, can be provided.

However, it is also advantageous for a plurality of suspension elements to be provided, precisely one suspension element or a plurality of suspension elements being provided for suspending the vehicle seat or respectively the seat part in the vehicle longitudinal direction and/or precisely one suspension element or a plurality of suspension elements being provided for suspending the vehicle seat or respectively the seat part in the vehicle transverse direction. In this way, a correspondingly high suspension comfort can be achieved in a constructionally compact manner.

At this point, it should further be noted that it is advantageous, in connection with a fluid suspension element, if the vehicle seat comprises one or more compressed gas sources. In this context, supply devices which provide the gas at a pressure above ambient pressure may preferably be considered as compressed gas sources. Particularly preferably, a compressed gas source herein is for example a compressor, a pressurised container, an additional volume or the like or combinations thereof.

It is further advantageous for at least one sensor device to be provided for detecting for example seat part movements, suspension movements, movements of the deformable suspension element, the bearing and deformation device, and/or vehicle movements, in particular in the vehicle longitudinal direction and/or vehicle transverse direction, and/or for detecting locations or respectively positions of the seat part, the suspension element, the bearing and deformation device and/or the vehicle, which sensor device can transmit data to a control device for actuating the compressed gas source.

It is further conceivable for a plurality of different sensor devices arranged in different positions to be provided for detecting separate or all of the aforementioned locations and/or movements to be provided.

The sensor device is preferably a distance measurement system for detecting the position of the deformation device, the flexion of the deformable suspension element and/or the extension of the deformable suspension element.

This last option is particularly advantageous, since it makes precise detection of the respective driver and/or seat situation possible, preferably in real time.

It is further also possible for a distance measurement system only to detect a zero position deviation, irrespective of a deformation.

It is further conceivable to store the data captured by the sensor devices, for example from the vehicle seat or the vehicle, for example so that they can be evaluated at a later point of time, for example at a maintenance deadline.

The object of the invention is also achieved by a motor vehicle or utility motor vehicle comprising a passenger compartment and a vehicle seat arranged therein for receiving a passenger, the motor vehicle or utility motor vehicle comprising a vehicle seat in accordance with one of the feature combinations disclosed herein.

Advantageously, the travel comfort in a motor vehicle or utility motor vehicle equipped with the present vehicle seat can be greatly improved, and this also greatly reduces the risk of accidents, since the passenger or respectively the person sitting on the vehicle seat is supported much better by the vehicle seat. As a result, in particular the vehicle driver can concentrate better on the actual driving operation of the motor vehicle or utility motor vehicle.

Further advantages, aims and properties of the present invention are explained by way of the appended drawings and the following description, in which by way of example in particular various possible embodiments of coupling devices with regard to a horizontal suspension device of a vehicle seat according to the invention are shown and described. Components which at least substantially correspond in function in the individual drawings may be denoted with like reference numerals therein, and the components may not be numbered and illustrated in all of the drawings.

BRIEF DESCRIPTION OF THE DRAWINGS

FIG. 1 is a schematic side view of a vehicle seat arranged in a vehicle, comprising a coupling device acting between a seat-part-side upper part of a horizontal suspension device and a body-side lower part of the horizontal suspension device;

FIG. 2A is a first schematic diagram of the horizontal suspension device, installed in the seat structure by way of example and comprising a suspension element and a damping element, in a zero position of said horizontal suspension device;

FIG. 2B is a second schematic diagram of the horizontal suspension device of FIG. 2A, comprising a seat-side upper part which is maximally deflected to the rear, in other words counter to the forward direction, from the zero position with respect to the body-side lower part;

FIG. 2C is a third schematic diagram of the horizontal suspension device of FIGS. 2A and 2B, comprising a seat-side upper part which is maximally deflected to the front, in other words in the forward direction, from the zero position with respect to the body-side lower part;

FIG. 3A is a schematic diagram of another possible position adjustment mechanism which can be used on the horizontal suspension device;

FIG. 3B is a further schematic diagram of the other possible position adjustment mechanism of FIG. 3A;

FIG. 12A is a schematic diagram of a sixth configuration option for a coupling device comprising a zero position correction unit in the form of a pneumatic suspension element, which can be installed in the horizontal suspension device, relating to a zero position of the seat part of the vehicle seat with respect to the vehicle longitudinal direction;

FIG. 12B is a further schematic view of the zero position correction unit relating to a first correction position with respect to the zero position of FIG. 12A;

FIG. 12C is a further schematic view of the zero position correction unit relating to a further correction position with respect to the zero position of FIG. 12A;

FIG. 14A is a schematic diagram of a seventh configuration option; and

FIG. 14B is a further schematic diagram of the seventh configuration option of FIG. 14A.

DETAILED DESCRIPTION

Figure 2D:
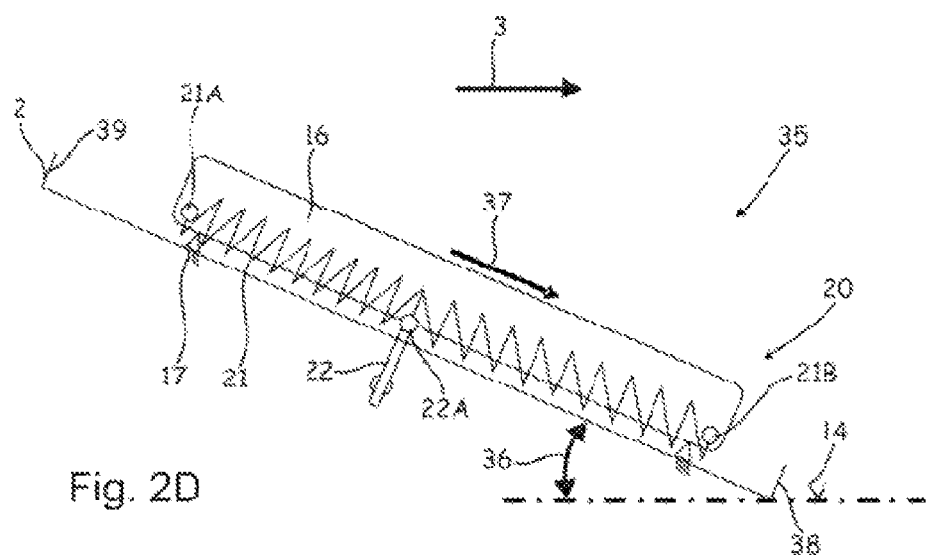
FIG. 2D is a further schematic diagram of the horizontal suspension device of FIG. 2A to 2C in an oblique position in a vehicle from FIG. 1 which is inclined forwards with respect to an imaginary horizontal plane.

The vehicle seat 1 schematically shown in FIG. 1 is arranged mounted orientated in the forward travel direction 3 in a vehicle 2. It is thus arranged orientated in the vehicle longitudinal direction X, and comprises a seat surface 4, extending in the vehicle transverse direction Y and in the vehicle longitudinal direction X, of a seat part 5 as well as a backrest part 6 extending in the vehicle vertical direction Z, which is preferably arranged pivotably with respect to the seat part 5. The vehicle seat 1 is positioned in front of a steering wheel 7, which can easily be operated by a person sitting in the vehicle seat. Further, at least one armrest 8 is arranged on the vehicle seat, in particular on the backrest part 6 thereof, to increase the travel comfort of the person.

Further, the vehicle seat 1 also comprises a seat substructure 9, by means of which the vehicle seat 1 is fixed to the body 10 of the vehicle 2. On the seat substructure, an actuation lever 11 of a displacement device (not shown) can also be seen, by means of which the vehicle seat 1 can be displaced horizontally in the vehicle longitudinal direction X when the displacement device is unlocked by actuating the actuation lever 11. The vehicle 2 shown in FIG. 1 stands on a ground surface 13 via the wheels 12 thereof (here numbered only by way of example), and is orientated flush with an imaginary horizontal plane 14 with respect to this ground surface 13, in such a way that the vehicle seat 1 and in particular the seat part 5 are also not at an inclination to this imaginary horizontal plane 14.

The seat substructure 9 further comprises a plurality of suspension and/or damping means (not shown in greater detail), in such a way that the seat part 5 in particular is arranged suspended or respectively damped well in the vehicle 2 with respect to the body 10, meaning that particularly high travel comfort can be achieved for the person sitting on the vehicle seat 1. The suspension device and/or damping devices may suspend or respectively damp the vehicle seat 1 in particular horizontally in the vehicle longitudinal direction X and/or the vehicle transverse direction Y as well as vertically in the vehicle vertical direction Z.

In particular, the seat substructure 2 comprises a horizontal suspension device 15, the basic functionality of which is shown schematically in FIG. 2A to 2D and 2F, comprising a seat-part-side upper part 16 and comprising a body-side lower part 17, between which alternatively configured coupling devices 20, 91, 106, 121, 141, 161 (see in particular FIGS. 4, 5, 8, 10, 11) may be arranged so as to interact in such a way that especially the seat-part-side upper part 16 is mounted displaceably with respect to the body-side lower part 17.

The horizontal suspension device 15, only the basic principle of which is shown in FIG. 2A to 2D and 2F, comprises a coupling device 20, by means of which the seat-part-side upper part 16 is coupled displaceably with respect to the body-side lower part 17.

The coupling device 20 comprises at least a deformable suspension element 21 and a bearing and deformation device 22, by means of which this deformable suspension element 21 can be deformed as soon as horizontal oscillation is excited.

In this context, the deformable suspension element 21 is fixed in a stationary manner on the seat-part-side upper part 16 in a first attachment region 21A and in a second attachment region 21B, the deformable suspension element 21 being operatively connected to the bearing and deformation device 22 in a mounting region 22A.

In this embodiment, in accordance with FIG. 2A to 2D and 2F, the deformable suspension element 21 is shown merely schematically as a helical spring element 23.

It will be appreciated that the deformable suspension element 21 may also be implemented using suspension elements having a different action or configuration, as is described in greater detail in the following by way of example.

Likewise, the bearing and deformation device 22 may also be configured differently, preferred configuration options for the bearing and deformation device 22 being described in greater detail below by way of example.

In this context, the deformable suspension element 21 forms a first coupling element 24 and the bearing and deformation device 22 forms a further coupling element 25 of the coupling device 20, so as to mount the seat-part-side upper part 16 displaceably with respect to the body-side lower part 17, in a flush manner with the imaginary horizontal plane 14 and in the horizontal suspension direction 26.

Further, the horizontal suspension device 15 shown schematically in FIG. 2A to 2D and 2F is also equipped with a damping device 29, although this is not absolutely compulsory. Thus, in the configuration options described in greater detail in the following, an explicit description of a damping device 29 of this type is dispensed with. This damping device 29 acts as an oscillation damper between the first coupling element 24, configured as a deformable suspension element 21, and the further coupling element 25, configured as a bearing and deformation device 22, in a manner known per se, and so the damping device 29 and the mode of operation thereof are not described in greater detail.

The present horizontal suspension device 15 is distinguished by a total suspension amplitude of 50 mm, in particular the seat-part-side upper part 16 being able to provide a translational forward spring excursion of +25 mm in the forward travel direction 3 in relation to the vehicle longitudinal direction X starting from a horizontal zero position 30, and a translational rearward spring excursion 32 of −25 mm counter to the forward travel direction 3 starting from this horizontal zero position 30.

Figure 2E:
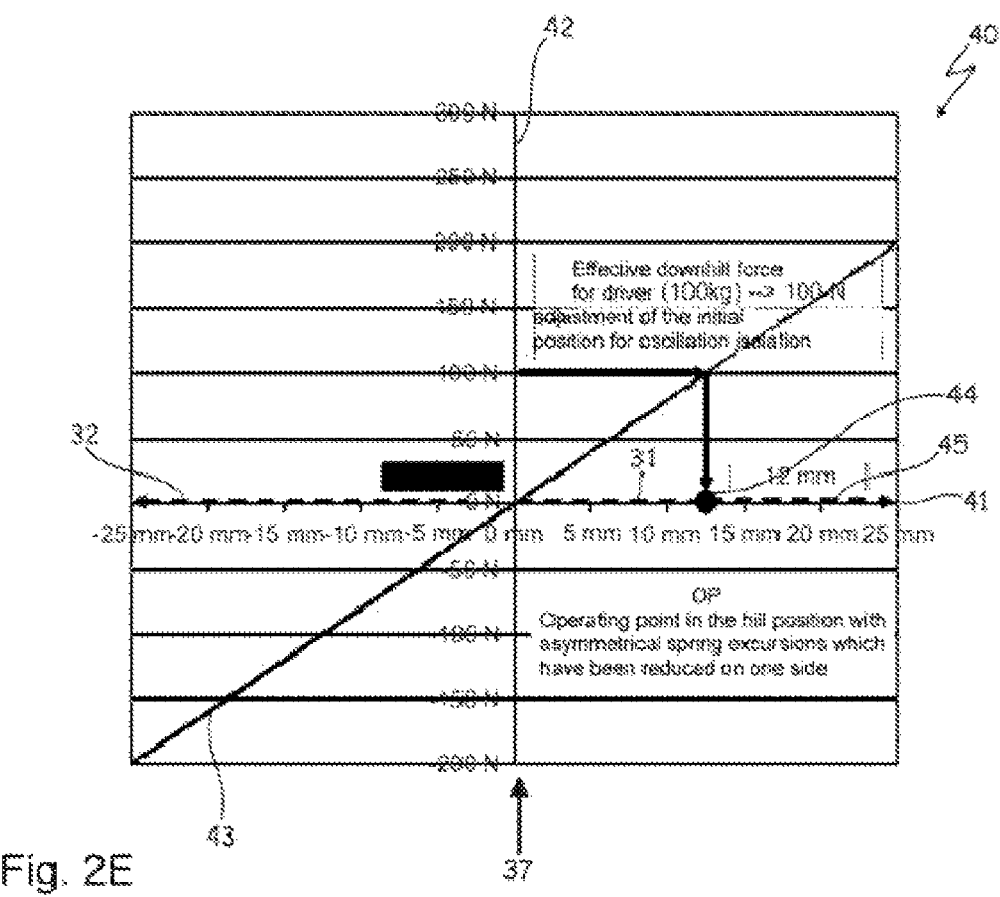
FIG. 2E is a schematic force/distance graph for a downhill force acting on the horizontal suspension device and a resulting deflection of the seat-part-side upper part of the horizontal suspension device.
Figure 2F:
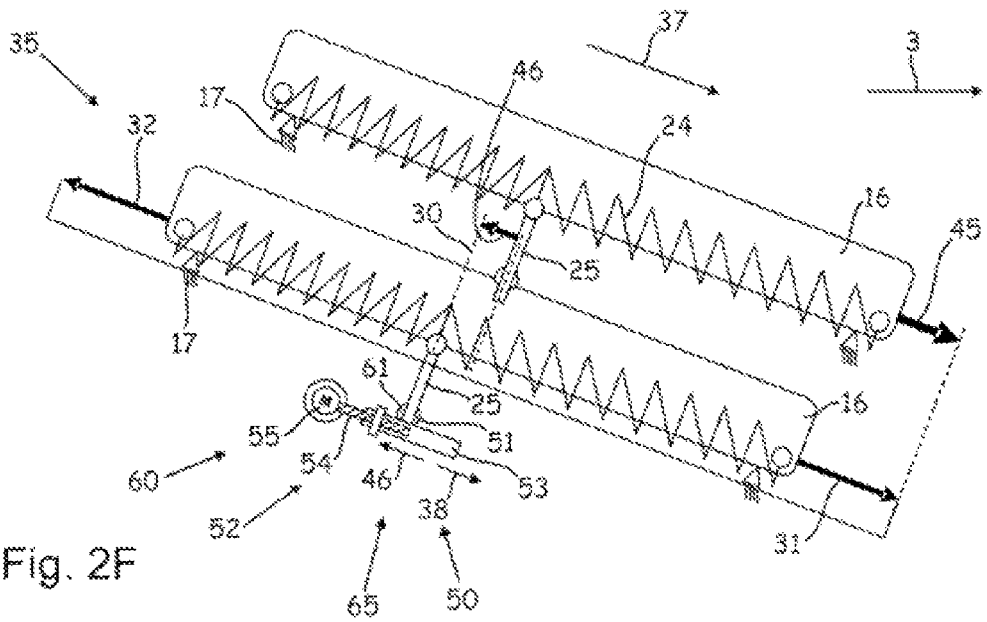
FIG. 2F is another schematic diagram of the horizontal suspension device of FIG. 2A to 2D with a corrective shift, with respect to the schematic diagram of FIG. 2D, of the seat-part-side upper part into the zero position by means of a first possible position adjustment mechanism.

Whilst FIG. 2A to 2C show the vehicle 2 and thus also the components of the horizontal suspension device 15 orientated in a flush manner with the imaginary horizontal plane 14, FIGS. 2D and 2F show the horizontal suspension device 15 in an orientation 35 at an inclination to the imaginary horizontal plane 14. This inclined orientation 35 comes about for example when the vehicle 2 travels downhill or downwards in the forward direction 3 or is respectively on a correspondingly inclined ground surface in uneven terrain. Thus, the vehicle 2 is at an inclination angle 36 to the imaginary horizontal plane 14 (FIGS. 2D and 2F).

Accordingly, in the inclined orientation 35, for example on a corresponding slope, the entire horizontal suspension device 15 is in a suspended position, preloaded by the person sitting on the vehicle seat 1, resulting in an operating point shift or respectively a shift of the seat-part-side upper part 16 out of the horizontal zero position 30, as is clearly illustrated for example in FIG. 2F.

In any case, the gravitational force loading the vehicle seat 1 brings about different downhill forces 37 on the seat part 5 or respectively on the seat-part-side upper part 16 of the horizontal suspension device 15 depending on the angle of inclination 36 and the person's weight. If the seat-part-side upper part 16 is now deflected out of the horizontal zero position 30 as a result, there is the risk of the seat-part-side upper part 16 striking against one of the end stops 38 or 39, since the original front spring excursion 31 in this embodiment is inevitably reduced from 25 mm beforehand to now only 12 mm, as can clearly be seen from the schematic force/distance graph 40 of FIG. 2E.

This force/distance graph 40 shows the spring rate against the spring excursion, the front spring excursion 31 and rear spring excursion 32 being shown on the x-axis 41 and the spring forces of the deformable suspension element 31 or the downhill forces 37 acting on the seat-part-side upper part 16 being shown on the y-axis 42. For example, the downhill forces 37 for a person weight of 100 kg are accordingly 100 newtons in accordance with the force/distance graph 40. In connection with the linear spring characteristic 43, there is now a shift of 13 mm in the operating point 44, merely leaving a residual spring excursion 45 of 12 mm for the front spring excursion 31.

If the horizontal suspension device 15 is now excited, there is the risk of this residual spring excursion 45 of 12 mm not providing sufficient compensation, in such a way that the horizontal suspension device 15 strikes against the front end stop 38, having a critical negative effect on the suspension comfort of the person sitting on the vehicle seat 1, and this is undesirable.

To prevent this, the present horizontal suspension device 15 or respectively the related coupling device 20 is characterized by that the further coupling element 25, in other words the bearing and deformation device 22, is arranged displaceably with respect to and on the body-side lower part 17, as is shown schematically by way of example in FIG. 2F. The upper part of the drawing shows the coupling device 20 in a position which is yet to be corrected, whilst the lower part of the drawing shows the coupling device 20 in a corrected position.

By means of the coupling device 20 according to the invention, it is possible, in accordance with the corrective shift 46, to shift the seat-part-side upper part 16 back into the horizontal zero position 30 counter the downhill forces 37, in such a way that, as a result, both the full front spring excursion 31 and the full rear spring excursion 32 are available by way of the horizontal suspension device 15.

In this context, a displacement, according to the invention in this respect, of the further coupling element 25 with respect to the body-side lower part 17 is achieved by means of a coupling point position adjustment unit 50, which is arranged acting between the further coupling element 25 and the body-side lower part 17, in such a way that a coupling point 51 between the further coupling element 25 and the body-side lower part 17 can be displaced with respect to the body-side lower part 17.

In this embodiment example, the coupling point position adjustment unit 50 is in the form of a linear adjustment device 52, the linear adjustment device 52 comprising a housing element 53 and a spindle element 54 which can be displaced in translation into or respectively out of said housing element.

The housing element 53 of the linear adjustment device 52 is attached to the further coupling element 25 via the coupling point 51, whilst the spindle element 54 thereof is articulated to the body-side lower part 17.

To adjust the spindle element 54 with respect to the housing element 53, the linear adjustment device 52 further comprises an electric motor 55, which is provided on the spindle element side.

At this point, it should further explicitly be noted that the linear adjustment device 52 can be implemented differently in terms of construction. For this purpose, a plurality of alternative embodiments for the linear adjustment device 52 exist in the art, one or other further being described in the following in connection with other possible configurations.

In any case, using the linear adjustment device 52 of the coupling point position adjustment unit 50, the corrective shift 46 can be undertaken in such a way that this coupling point position adjustment unit 50 equally forms a zero position correction unit 60 for adapting the horizontal zero position 30 of the horizontal suspension device 15.

In this context, the zero position correction unit 60 is preferably constructed in such a way that the further coupling element 25 and the body-side lower part 17 are coupled to one another at a shared lower part coupling point 61, in such a way that the position of the lower part coupling point 61 can be set variably with respect to the body-side lower part 17.

This means that the distance between the coupling point 51 or respectively lower part coupling point 61 and the body-side lower part 17 can be varied as required.

For a suitable configuration of the coupling device 20, it can further comprise a spring characteristic adaptation unit 65 for adapting the linear spring characteristic 43 of the deformable spring element 21, in addition or as an alternative to the zero position correction unit 60.

Figure 2G:
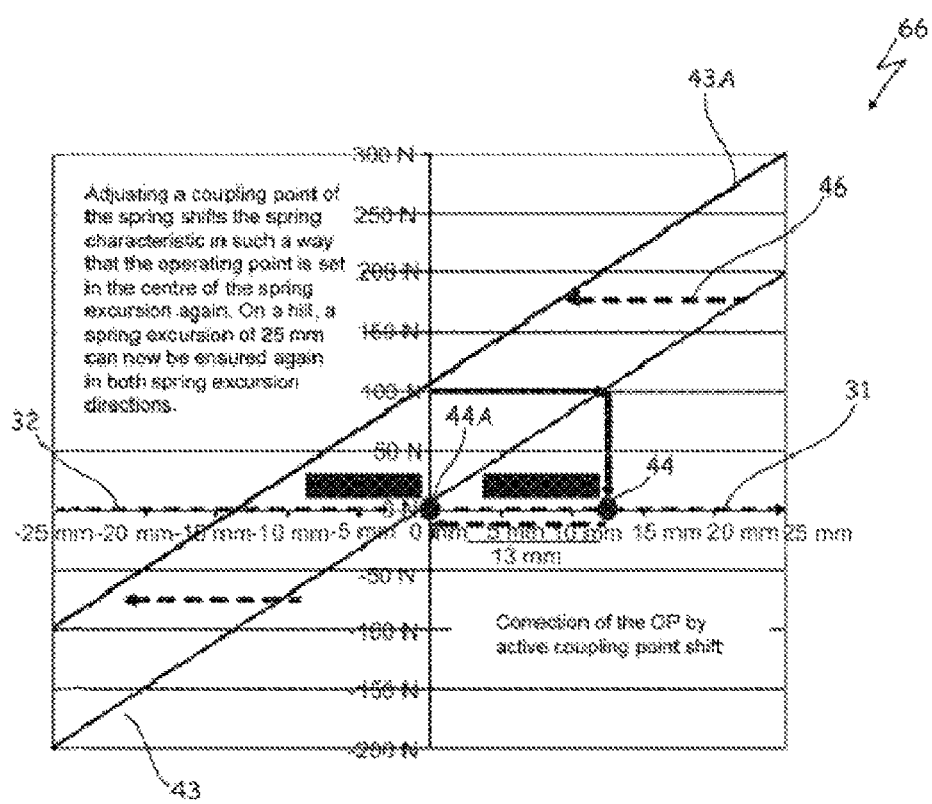
FIG. 2G is another schematic force/distance graph for a downhill force acting on the horizontal suspension device, a resulting deflection of the seat-part-side upper part of the horizontal suspension device, and a corresponding corrective shift in accordance with the schematic diagram of FIG. 2F.

Accordingly, this spring characteristic adaptation unit 65 is also configured in such a way that the further coupling element 25 and the body-side lower part 17 are coupled to one another at a shared lower part coupling point 61, in such a way that the position of the lower part coupling point 61 can be set variably with respect to the body-side lower part. The mode of operation of a coupling point position adjustment unit 50 of this type is shown in the force/distance graph 66 of FIG. 2G, the linear spring characteristic 43 being shifted by the corresponding corrective shift 46 of 13 mm in such a way, in accordance with the shifted linear spring characteristic 43A, that a corrected operating point 44A still passes through the origin formed by the x-axis 41 and y-axis 42, in spite of the acting downhill forces 37 of 100 newtons.

The further possible position adjustment mechanism 70 shown in FIGS. 3A and 3B comprises a pendulum device 71, which is mounted so as to be movable in rotation about a pendulum axis 72 so as to be able to compensate any downhill forces brought about by a slope by means of a pendulum function. The pendulum device 71 comprises a pendulum arm element 73, which comprises a pendulum weight element 75 on one end 74 thereof. The other end 76 thereof is attached to the deformable suspension element 21 or respectively the first coupling element 24 of the horizontal suspension device 15. If the vehicle 2 is now in a hill position or respectively in the inclined orientation 35, in which in particular the seat-part-side upper part 16 is at an inclination to the imaginary horizontal plane 14 (shown reflected from FIG. 3A), the pendulum device 71 rotates about the pendulum axis 72 in the direction of rotation 77 (cf. FIG. 3B) as a result of the pendulum weight element 75, from a previously deflected position 78 and back into a vertical pendulum position 79, increasing the spring bias of the deformable suspension element 21 in such a way that in particular the seat-part-side upper part 16 is displaced back into the horizontal zero position 30, in such a way that the entire front spring excursion 31 as well as the entire rear spring excursion 32 on the horizontal suspension device 15 are available on the two sides of this horizontal zero position 30.

Thus, by the of the present pendulum device 71 implements a constructionally simple configuration option for a passive zero position correction unit or respectively a passive spring characteristic adaptation unit is realized.

As a result of the pendulum device 71 and the relevant lever transmission in relation to the pendulum arm element 73, long-term approach towards an end stop can be countered even with low weights of the pendulum weight element 75. The pendulum device 71 advantageously increases the spring bias and thus causes the entire system to be positioned in the centre of the spring excursion or respectively in the horizontal zero position.

As a result of a frequency selection which is preferably additionally provided in the pendulum arm element 73, high-frequency excitation introductions of the inclination of the vehicle seat 1 can be considered in a differentiated manner. Long-term accelerations, such as during braking or acceleration, likewise lead to a constant adjustment, meaning that more spring force is applied counter to this movement. The frequency selection has the particular advantage that, in the event of high-frequency excitation, stability can still be maintained in the system, suppressing escalation of the horizontal suspension device 15 in particular.

The pendulum device 71 may also be implemented electronically, for example using acceleration sensors.

The corresponding bias may also be implemented using a linear adjustment device.

The pendulum device 71 is ideally damped in such a way that it does not move about the pendulum axis 72 with each excitation.

With a 20% slope in relation to a hill position, for example, one possible configuration of the pendulum device 71 provides countering using 20% of an incident load-making 15 kg, equivalent to 150 newtons, in the case of a 75 kg person. Thus, for a 20% slope, the pendulum arm element 73 should rotate through 11.3° about the pendulum axis 72, in which case approximately 150 newtons act at approximately 20 mm for a progressive spring characteristic. This results in a side length of 20 mm/cos)(11.3°)=20 mm/s=20.40 mm. The torque on the pendulum element 73 comes to M=F*l=0.6 Nm, ignoring the vertical distortion due to the circular path. The pendulum arm element 73 should be provided for example with a weight of 3 kg between the pendulum axis 72 and the first end 74, making it possible to achieve 29.4 newtons at a side length of 104.0 mm. If the pendulum arm element 73 comprises a weight of 5 kg between the pendulum axis 72 and the first end 74, the side length is reduced to 62.4 mm. A side of this type could also be configured as a shaft element comprising a cam.

Figure 4:
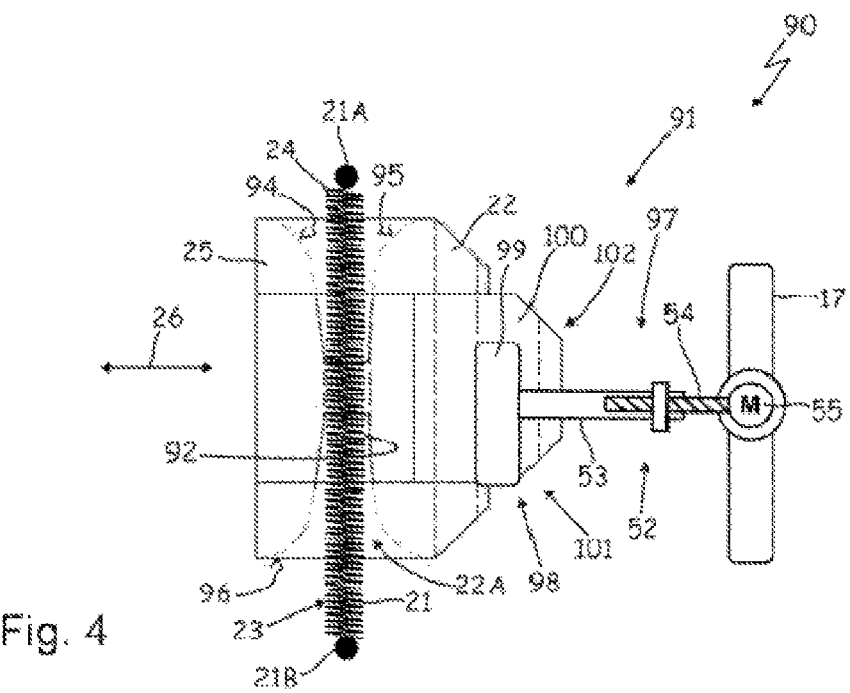
FIG. 4 is a schematic diagram of a first alternative configuration option for a coupling device for coupling the seat-part-side upper part and the body-side lower part of the horizontal suspension device.

In relation to the first alternative configuration 90, shown in greater detail in FIG. 4, of a further coupling device 91, which can be installed into the previously disclosed horizontal suspension device 15 of the vehicle seat 1 (see FIG. 1), the more detailed construction of the bearing and deformation device 22, by means of which the deformable suspension element 21 can be deformed, can clearly be seen.

The bearing and deformation device 22 comprises a receiving space 92 in which the deformable suspension element 21 is arranged extending transversely to the horizontal suspension direction 26.

In addition to the orientation thereof extending transversely to the horizontal suspension direction 26, the receiving space 92 is further distinguished in particular by two mutually facing contact faces 94 and 95, which are each curved differently. This results in two asymmetrically configured mutually facing contact faces 94 and 95, meaning that the receiving space 92 is also configured asymmetrically at least in relation to a horizontal suspension acting in the vehicle longitudinal direction X. This is because the weight displacement of the driver is different for forward and respectively rearward inclinations.

In relation to a horizontal suspension operating in the vehicle transverse direction Y, a conventional receiving space would be symmetrical. Thus, the two contact faces 94 and 95 would also be identically curved.

The receiving space 92 extends transversely to the horizontal suspension direction, and the receiving space 92 is opened at the two longitudinal ends thereof, in such a way that the deformable suspension element 21 can project out beyond the lateral edge regions 96 (here numbered only by way of example) of the bearing and deformation device 22.

Thus, the two contact faces 94 and 95 form the decisive contact face portions of the bearing and deformation device 22 for the horizontal suspension with respect to the deformable suspension element 21.

The deformable suspension element 21 is the helical suspension element 23 described previously in FIG. 2A to 2D and 2F, the deformable suspension element 21 being mounted both in the bearing region 22A of the bearing and deformation device 22 and on the seat-part-side upper part 16 by means of the two attachment regions 21A and 21B (see for example FIG. 2A).

If the seat-part-side upper part 16 is now deflected with respect to the body-side lower part 17 or vice versa, the helical suspension element 23 is curved by the bearing and deformation device 22, producing corresponding restoration forces so as to bring the horizontal suspension device 15 into the horizontal zero position 30 thereof.

For this purpose, the bearing and deformation device 22 is coupled to the body-side lower part 17 indirectly by means of a further coupling point position adjustment unit 97.

In this context, the coupling point position adjustment unit 97 is configured as a further zero position correction unit 60, the further coupling point position adjustment unit 97 in turn comprising the linear adjustment device 52, the housing element 53 of which is mounted on the bearing and deformation device 22 and the spindle element 54 of which is articulated directly to the body-side lower part 17.

A peculiarity of this further coupling device 91 is that the coupling point position adjustment unit 97 is arranged displaceably in a transverse manner to the horizontal suspension direction 26, in such a way that the horizontal suspension device 15 can also be displaced with respect to the body-side lower part 17 transverse to this horizontal suspension direction 26. For this purpose, at least in this embodiment, the housing element 53 is mounted on the bearing and deformation device 22 by means of a slide guide 98, a slide block element 99 being provided on the housing element 53 and a corresponding slide groove 100 being provided on the bearing and deformation device 22 for this purpose, the sliding block element 99 being mounted displaceably in translation in said groove with respect to the horizontal suspension direction 26.

The slide guide 98 thus incorporates a coupling point 101, for example of a different configuration, of the further coupling point position adjustment unit 97 or respectively a correspondingly differently configured lower part coupling point 102 of the further zero position correction unit 60, the coupling point 101 or respectively the lower part coupling point 102 being displaceable with respect to the body-side lower part 17 by means of the coupling point position adjustment unit 97.

Within the meaning of the present invention, this slide guide 98 thus forms the coupling point 101 between the bearing and deformation device 22 and the body-side lower part 17 which can be adjusted with respect to the body-side lower part 17 by means of the coupling point position adjustment unit 97.

Thus, the further coupling element 25 in the form of the bearing and deformation device 22 is in turn arranged displaceably with respect to and on the body-side lower part 17. It is thus clear that the second coupling element 25 can be moved either towards the body-side lower part 17 or away from the body-side lower part 17 in the horizontal suspension direction 26, depending on how the coupling point position adjustment unit 97 is actuated. As a result, the position in particular of the seat-part-side upper part 16 can be set accordingly with respect to the horizontal zero position 30, in such a way that the horizontal suspension device 15 can operate in the optimum operating range thereof.

Figure 5:
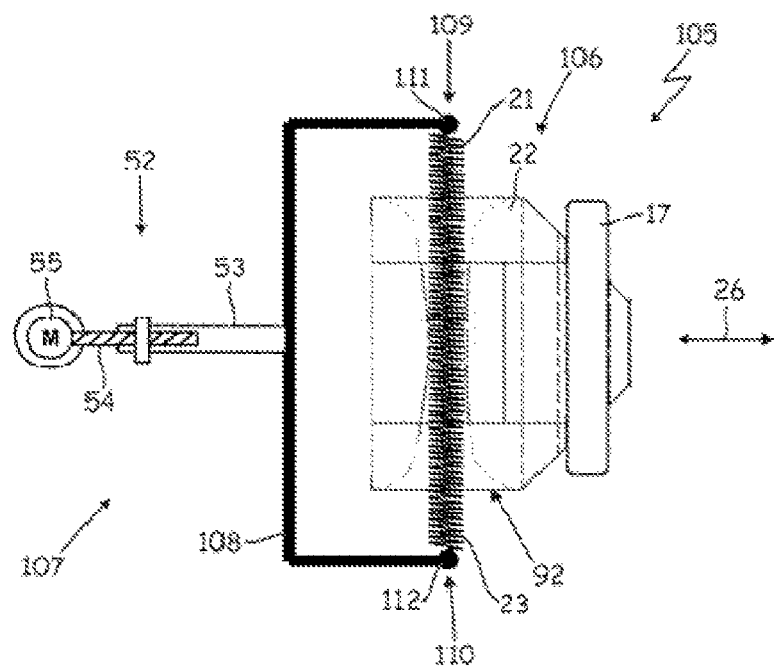
FIG. 5 is a schematic diagram of a second alternative configuration option of a coupling device for coupling the seat-part-side upper part and the body-side lower part of the horizontal suspension device, a coupling element of a coupling point position adjustment unit being arranged articulated to the seat-part-side upper part on both sides.

In the second alternative configuration 105, shown in FIG. 5, of a further coupling device 106, the body-side lower part 17 of the horizontal suspension device 15 is firmly attached directly to the bearing and deformation device 22.

The deformable suspension element 21 is in turn arranged in the receiving space 92 of the bearing and deformation device 22 as a helical suspension element 23.

As stated previously, this further coupling device 106 further comprises a coupling point position adjustment unit 107 in the form of the linear adjustment device 52, the coupling point position adjustment unit 107 or respectively the linear adjustment device 52 additionally comprising a fork element 108, which is operatively connected to both ends 109 and 110 of the deformable suspension element 21. The coupling points 111 and respectively 112 between the deformable suspension element 21 and the seat-part-side upper part 16 are located at the two ends 109 and 110 (cf. for example FIG. 2A).

In this embodiment, the spindle element 54 of the linear adjustment device 52 of the further coupling point position adjustment unit 107 is firmly articulated to the seat-part-side upper part 116.

Thus, by means of this coupling point position adjustment unit 107, a zero position correction unit 60 and even a spring characteristic adaptation unit 65 can also be implemented, since the deformable suspension element 21 can be deformed by means of the linear adjustment device 52. Thus, the two coupling points 111 and 112 can be displaced synchronously with respect to the seat-part-side upper part 16 (cf. for example FIG. 2A), so as to undertake a zero position correction and/or alter the spring characteristic.

Figure 6:
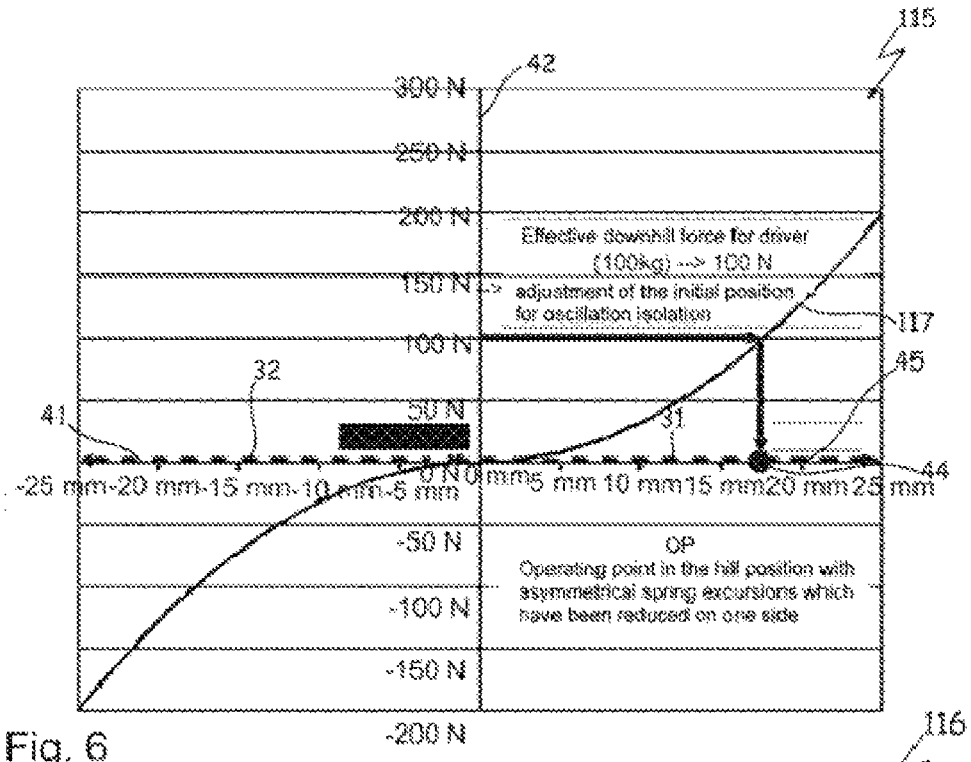
FIG. 6 is a schematic force/distance graph for a downhill force acting on the horizontal suspension device and a resulting deflection of the seat-part-side upper part of the horizontal suspension device in accordance with the configuration shown in FIG. 4 or FIG. 5.
Figure 7:
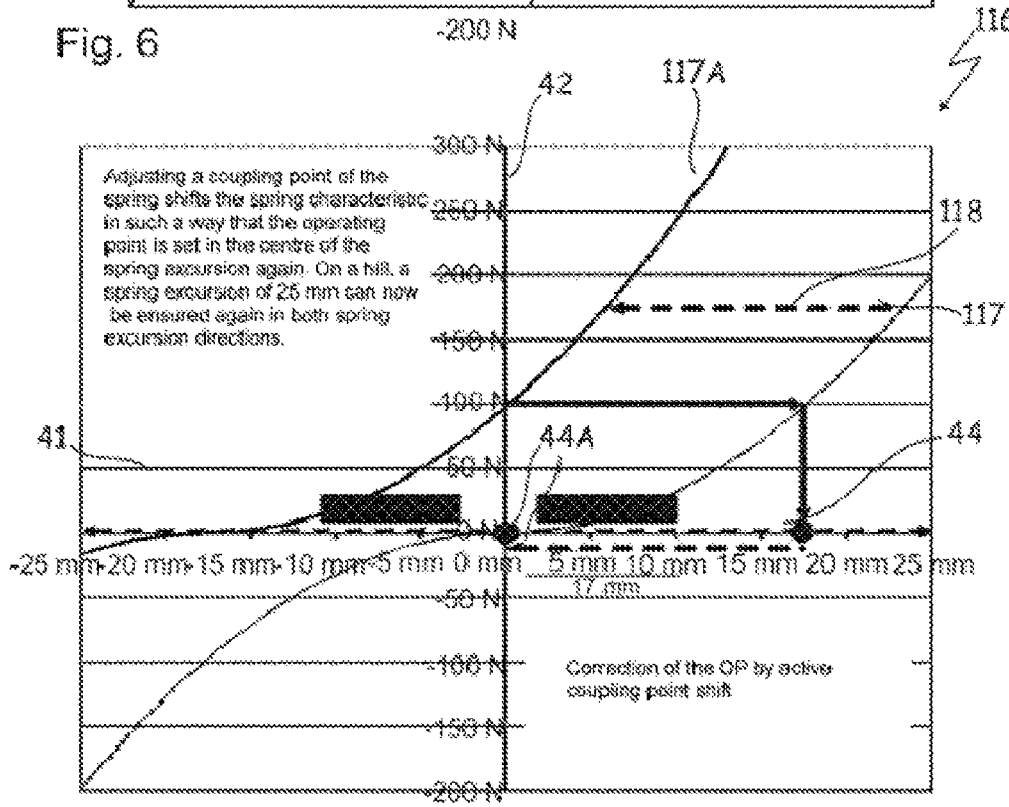
FIG. 7 is a schematic force/distance graph for a downhill force acting on the horizontal suspension device, a resulting deflection of the seat-part-side upper part of the horizontal suspension device, and a corresponding corrective shift in accordance with the configuration shown in FIG. 4 or FIG. 5.

This is also shown in the two further force/distance graphs 115 (see FIG. 6) and 116 (see FIG. 7) of FIGS. 6 and 7.

Whereas the force-distance graph 115 shows the spring rate against the spring excursion for the two configurations 90 and respectively 105, the force/distance graph 116 accordingly shows the spring rate against the spring excursion with active correction of the initial position.

The force/distance graph 115 thus illustrates the spring rate against the spring excursion, the x-axis 41 showing both the front spring excursion 31 and the rear spring excursion 32, and the y-axis 42 showing the spring forces of the deformable suspension element 21 or the downhill forces acting on the seat-part-side upper part 16. For example, for a person weight of 100 kg, the downhill forces 37 are accordingly 100 newtons. In connection with a progressive spring characteristic 117, there is now a shift of 17 mm in the operating point 44, in such a way that only a residual spring excursion 45 of 8 mm remains for the front spring excursion 31.

The mode of operation of the coupling point position adjustment unit 107 is shown in the force/distance graph 116 of FIG. 7, the progressive spring characteristic 117 being shifted by a corresponding corrective shift 118 of 17 mm in accordance with the shifted progressive spring characteristic 117A, in such a way that, in spite of effective downhill forces of 100 newtons, a corrected operating point 44A also extends through the origin formed by the x-axis 41 and the y-axis 42. In addition, however, the progressive spring characteristic 117 has been changed in terms of progression.

Figure 8:
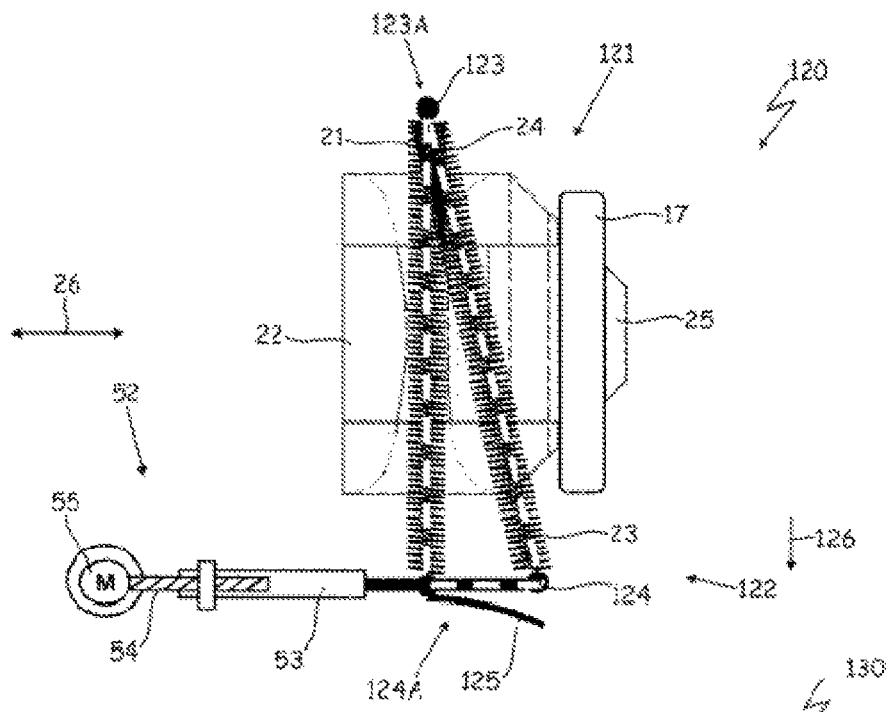
FIG. 8 is a schematic diagram of a third alternative configuration option for a coupling device for coupling the seat-part-side upper part and the body-side lower part of the horizontal suspension device, a further coupling element of a coupling point position adjustment unit being arranged articulated to one side of the seat-part-side upper part, and it being possible to guide a corresponding coupling point along a curved path.

The third alternative configuration 120, shown in FIG. 8, of a further coupling device 121, by means of which the horizontal suspension device 15 can be equipped, likewise in turn comprises a deformable suspension element 21 in the form of a helical suspension element 23 and a bearing and deformation device 22 in which the deformable suspension element 21 is arranged transversely to the horizontal suspension direction 26, in particular the bearing and deformation device 22 in turn being constructed identically to the other alternative configurations 90 and respectively 105 described previously, so that with respect to this a further illustration of construction and the way of operation of the bearing and deformation device 22 is dispersed with.

In this context, the bearing and deformation device 22 also in turn forms the second coupling element 25, which is attached directly to the body-side lower part 17 of the horizontal suspension device 15.

Further, this third alternative configuration 120 of the further coupling device 121 is characterized by a coupling point position adjustment unit 122 of a different configuration, in which the first coupling element 24 (helical suspension element 23) is coupled on the one hand directly to a first coupling point 123A configured as a rotary bearing 123 and on the other hand indirectly to a second coupling point 124A configured as a linear bearing 124, via the linear adjustment device 52 on the seat-part-side upper part 16.

Whereas the first coupling element 24 is attached rotatably but firmly to the seat-part-side upper part 16 of the horizontal suspension device 15 by means of the first coupling point 123A, it is attached displaceably with respect to and on the seat-part-side upper part 16 in relation to the second coupling point 124A by means of the linear adjustment device 52, the linear bearing 124 having a curved path 125 in this embodiment.

If the housing element 53 of the linear adjustment device 52 is now moved with respect to the spindle element 54 of the linear adjustment device 52 in accordance with the horizontal suspension device 26 by means of the electric motor 55, the second coupling point 124A is not only shifted in a straight line flush with the horizontal suspension direction 26, as with the previously described alternative configurations 90, 105 and 120, but additionally moves along the curved path 125, including a transverse displacement component 126 accordingly transverse to the horizontal suspension direction 26.

Figure 9:
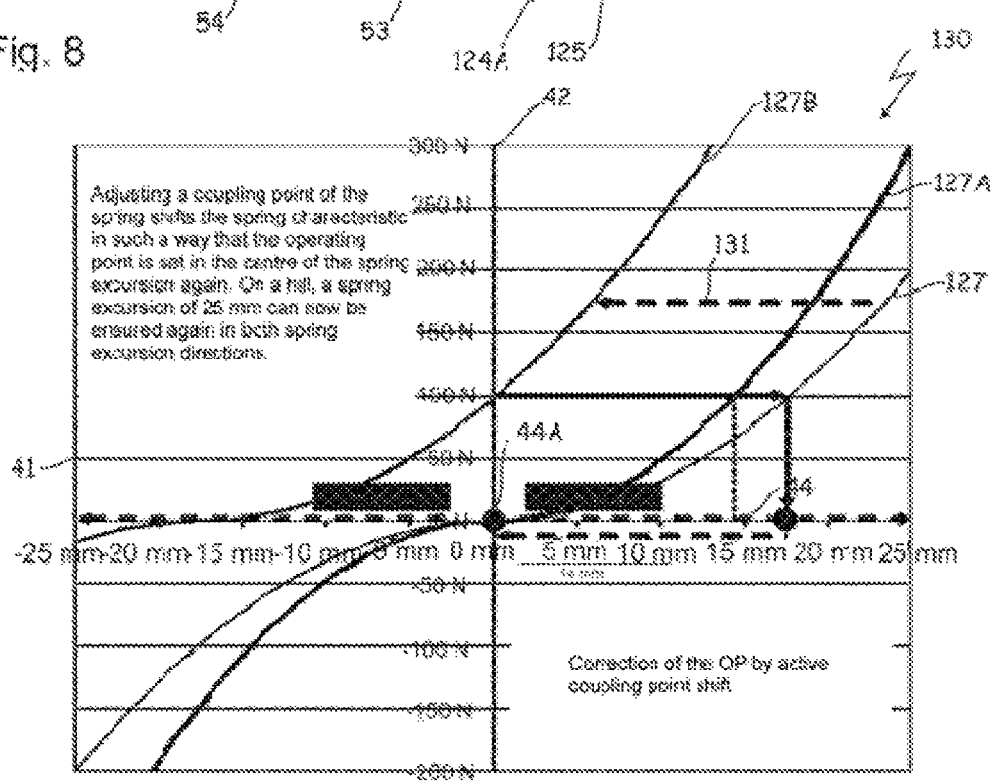
FIG. 9 is a schematic force/distance graph for a downhill force acting on the horizontal suspension device and a resulting deflection of the seat-part-side upper part of the horizontal suspension device in accordance with the configuration shown in FIG. 8.

As a result, the helical suspension element 23 can additionally be elongated in the direction of the longitudinal extent thereof, since the two coupling points 123A and 124A are additionally at a distance from one another transverse to the horizontal suspension device 26, meaning that the corresponding progressive spring characteristic 127 of the deformable suspension element 21 can additionally be altered as an altered progressive spring characteristic 127A and also further as a displaced and altered progressive spring characteristic 127B (cf. FIG. 9). By means of the linear bearing 124 at the second coupling point 124A, an extended adjustment of the second coupling point 124A is thus achieved, in which restoring forces can additionally be applied. Depending on the form of the linear bearing 124, the spring stiffness of the helical suspension element 23 can additionally be increased or decreased.

Advantageously, as a result of the additional transverse adjustment of the second coupling point 124A, bracing of the helical suspension element 23 is achieved as well as a zero position correction, meaning that a steeper spring characteristic can be achieved.

The linear bearing 124 or respectively the curved path thereof may for example be in the form of a slide guide groove in which a sliding bearing element is guided.

As an alternative to the curved path 125, it is also possible merely to provide a path arranged obliquely with respect to the horizontal suspension direction 26.

Thus, the coupling point position adjustment unit 122 of a different configuration incorporates both a zero position correction unit 60 and a spring characteristic adaptation unit 65.

The force/distance graph 130 of FIG. 9 thus shows the spring rate against the spring excursion with activated correction of the initial position in relation to the further coupling device 121 in accordance with the third alternative configuration 120 of FIG. 8.

The mode of operation of the other coupling point position adjustment unit 122 is further illustrated in the force/distance graph 130 of FIG. 9, the original progressive spring characteristic 127 being shifted by a corresponding corrective shift 131 and an elongation of the helical suspension element 23 of 17 mm in total, in accordance with the shifted and altered progressive spring characteristic 117B, in such a way that, in spite of the effective downhill forces, a corrected operating point 44A still extends through the origin formed by the x-axis 41 and the y-axis 42.

Thus, as a result of the linear bearing 124 or respectively the curved path 125, a further progression or respectively a steeper spring characteristic 127A can be achieved, meaning that the path of the correction displacement 131 can advantageously be reduced, meaning that the horizontal suspension device 15 can be even more compact in construction. As an alternative to the curved path 125, a rotary bearing in the form of an adjustable lever system could generally also be provided, avoiding sliding or respectively friction.

The slide form has the further advantage that the slide guide can eliminate the extension induced by the adjustment.

The one-sided adjustment has the advantage that no parallel guidance of the linear adjustment is required.

Figure 10:
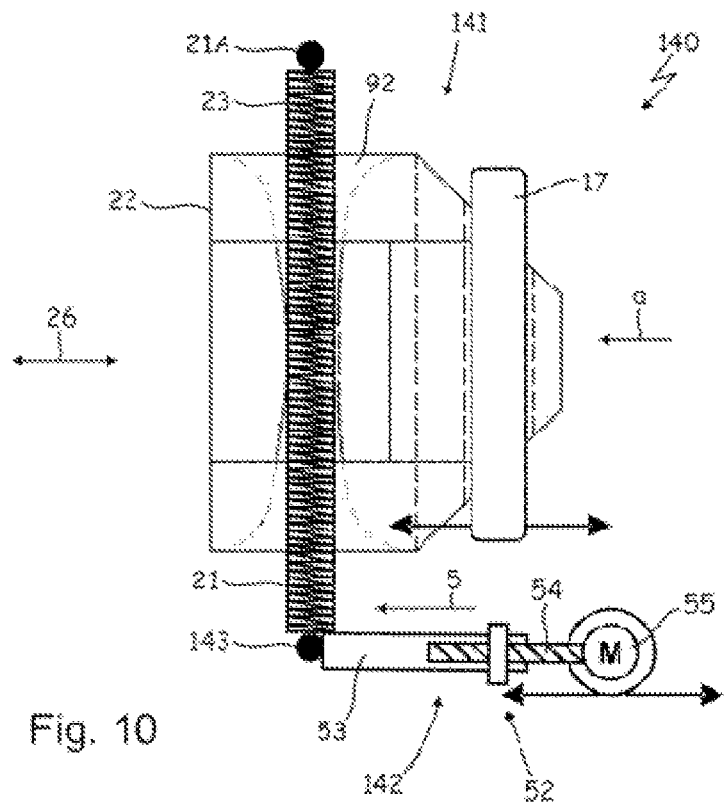
FIG. 10 is a schematic view of a fourth configuration option for a coupling device.

The fourth alternative configuration 140, shown in FIG. 10, of a further coupling device 141 is basically characterized by a bearing and deformation device 22 of the same construction, in which a deformable suspension element 21 in the form of a helical suspension element 23 is mounted.

On the one hand, the deformable suspension element 21 is directly attached in a stationary manner on the body-side upper part 16 by means of an attachment region 21A (see for example FIG. 2A). On the other hand, it is coupled indirectly, and therefore displaceably, to the seat-part-side upper part 16 by means of a coupling point position adjustment unit 142 in relation to a coupling point 143 which is displaceable with respect to the seat-part-side upper part 16.

Herein, the coupling point position adjustment unit 142 is in turn in the form of the linear adjustment device 52. The housing element 53 of the linear adjustment device 52 is attached to the deformable suspension element 21 by means of the coupling point 143, whilst the spindle element 54 thereof is articulated to the seat-part-side upper part 16.

Figure 11:
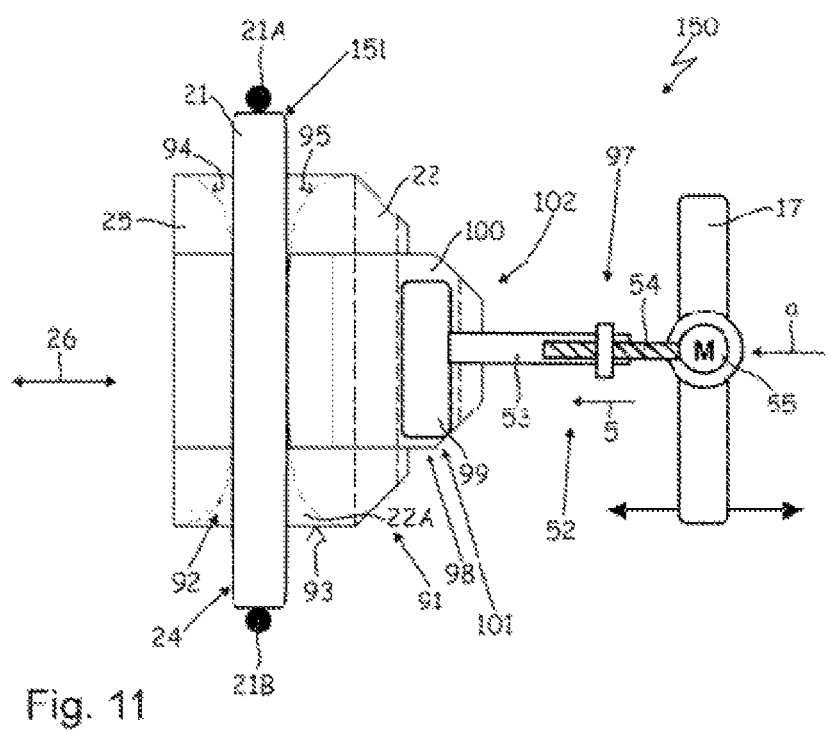
FIG. 11 is a schematic view of a fifth configuration option for a coupling device, comprising a deformable suspension element in the form of a pneumatic suspension element which can be installed in the horizontal suspension device.

The fifth alternative configuration 150 shown in FIG. 11 is substantially identical in construction to the first alternative configuration 90 shown in FIG. 4, but in this case the deformable suspension element 21 is in the form of a pneumatic suspension element 151, which is hose-like in form. Thus, as regards the precise construction of the fifth alternative configuration 150, reference is made to the first alternative configuration 90 and the corresponding reference numerals, and only the differences are described, so as to avoid repetitions.

The pneumatic suspension element 151 thus forms a pneumatic muscle, in such a way that, because of the high flexibility thereof, the pneumatic suspension element 151 can adapt even more easily to the shape of the receiving region 92 respectively or the relevant contact faces 94 and 95 thereof.

In particular, both for the fourth alternative configuration 140 of the further coupling device 141 shown in FIG. 10 and for the fifth alternative embodiment 150 shown in FIG. 11, for a small excitation a linear adjustment s with acceleration a is ideally actuated in the same direction, meaning that the spring bias in the deflection can be eliminated.

For stronger excitation, the aim is to actuate the linear adjustment s for the acceleration a in the opposite direction, meaning that a reinforced spring characteristic can be set, so as to prevent possible striking of the seat-part-side upper part 17 on end stops 38 and 39 (see FIG. 2D). After the acceleration a dies down, the linear adjustment s is returned to the initial position, before the increased spring bias can lead to a rebound.

For a long-term deviation in relation to an inclined orientation 35 (see for example FIG. 2D), a constant linear adjustment can be undertaken, so as to counter the downhill forces 37 (see for example FIG. 2D).

In both cases (alternative configurations 140 and 150), a change in the restoring forces towards the initial position is achieved by way of a linear adjustment of the coupling point 143 for the seat-part-side upper part 16 or 101 or the coupling point 101 for the body-side lower part 17.

For a sixth alternative configuration 160, shown in FIG. 12A to 12C, of a further coupling device 161, there is no coupling point position adjustment unit as disclosed above, and so in particular a zero position correction unit of this type can be implemented only by means of the pneumatic suspension element 151, but with a low.

Flexion or respectively extension of the pneumatic suspension element 151 is easier for a low pressure inside the pneumatic suspension element 151, meaning that a lower spring constant can be provided.

With increasing deflection, the pressure and thus the counter force of the pneumatic suspension element 151 are increased, so as to counter striking in particular of the seat-part-side upper part 16 of the horizontal suspension device 15 in a desired manner. On a return path, the pressure is released, in such a way that the restoring force is reduced and escalation due to a rebound can be prevented.

A long-term deviation from the horizontal zero position 30, for example in operation during ascents and descents of the vehicle 2, can be countered by continuously high pressure, and a sufficient spring excursion for the adjustment can thus be ensured. In this way, a rising spring characteristic is achieved. Thus, by means of the further coupling device 161, a zero position correction unit can be implemented, within narrow limits, as well as a spring characteristic adaptation unit.

However, in this context, the efficiency of the restoration is not as high as in connection with the coupling point position adjustment units 50, 97, 107, 122 and 142 which were disclosed above.

FIG. 12A to 12C further show the further coupling device 161 in connection with a fluid supply device 170, this fluid supply device 170 being arranged in the region of the seat substructure 9 of the vehicle seat 1 (see FIG. 1).

This fluid supply device 170 comprises a fluid reservoir 171, which is operatively fluidically connected to the pneumatic suspension element 154 via a fluid connecting line 172. An air inlet and outlet valve 173 is further provided between the fluid reservoir 171 and the pneumatic suspension element 154, and further comprises a throttle element 174.

In relation to the fluid reservoir 171, a reliable fluid supply is ensured by a compressor 175 connected to this fluid reservoir 171, in such a way that a sufficient volume of fluid for modulating the pneumatic suspension element 151 is always available.

Figure 12D:
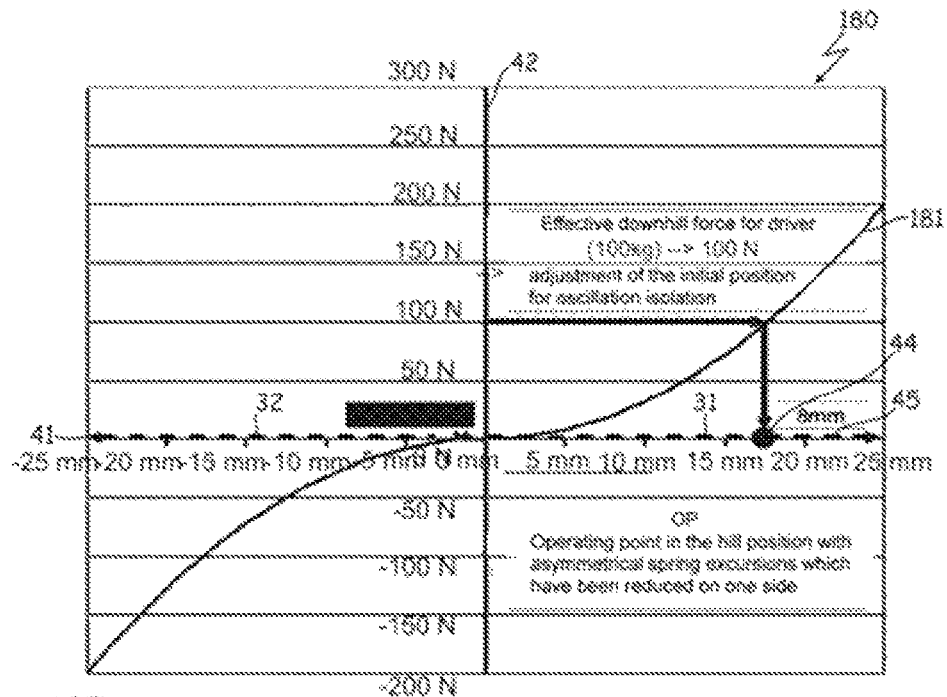
FIG. 12D is a schematic force/distance graph, based on the zero position correction unit of FIG. 12A to 12C, relating to a downhill force acting on the horizontal suspension device and a resulting deflection of the seat-part-side upper part of the horizontal suspension device.

The force/distance graph 180 of FIG. 12D illustrates the spring rate against the spring excursion for the sixth alternative configuration, the x-axis 41 showing both the front spring excursion 31 and the rear spring excursion 32, and the y-axis 42 showing the spring forces of the deformable suspension element 151 or the downhill forces acting on the seat-part-side upper part 16. For example, the downhill forces for a person weight of 100 kg are accordingly 100 newtons. In connection with a progressive spring characteristic 181, there is now a shift of 17 mm in the operating point 44, merely leaving a residual spring excursion 45 of 8 mm for the front spring excursion 31.

Figure 12E:
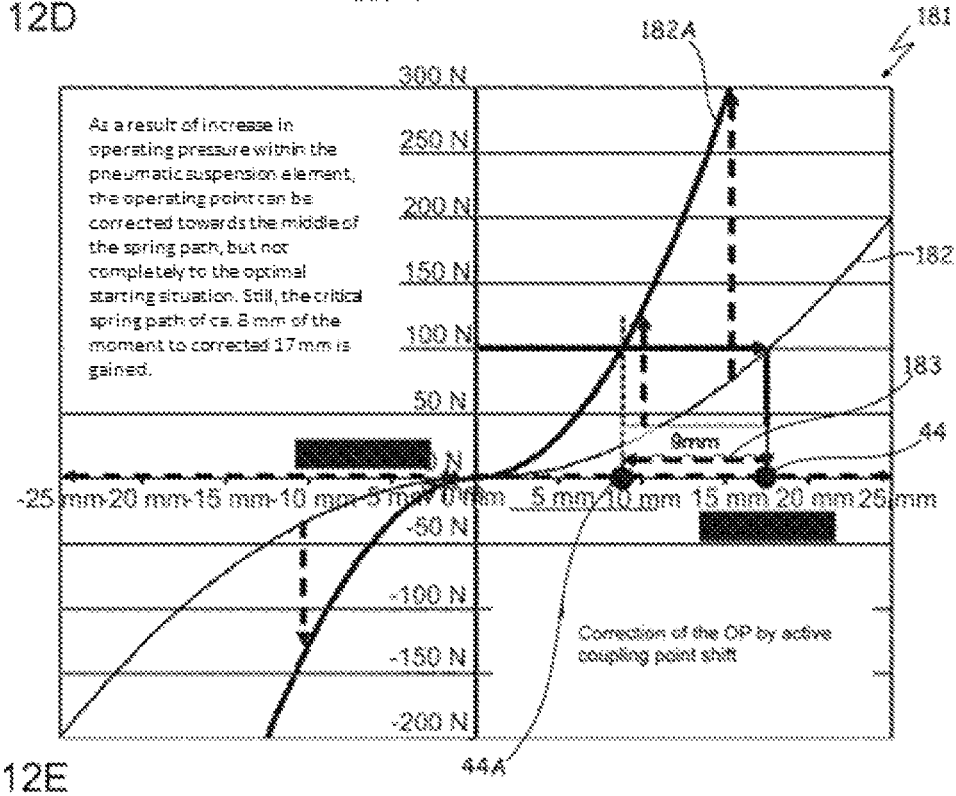
FIG. 12E is a schematic diagram of a force/distance graph, based on FIG. 12A to 12C, relating to a downhill force acting on the horizontal suspension device and a resulting deflection of the seat-part-side upper part of the horizontal suspension device in accordance with the configuration shown in FIG. 8.

For the force/distance graph 181 of FIG. 12E, the spring rate is shown against the spring excursion with active correction of the initial position with respect to the further coupling device 161.

As a result of an increase in operating pressure within the pneumatic suspension element 151, the progressive spring characteristic 182 rises to the altered progressive spring characteristic 182A, meaning that the operating point 44 can be shifted by a corrective shift 183 to the corrected operating point 44A. As a result, the residual spring path 45 of 8 mm is increased to 17 mm.

Figure 13:
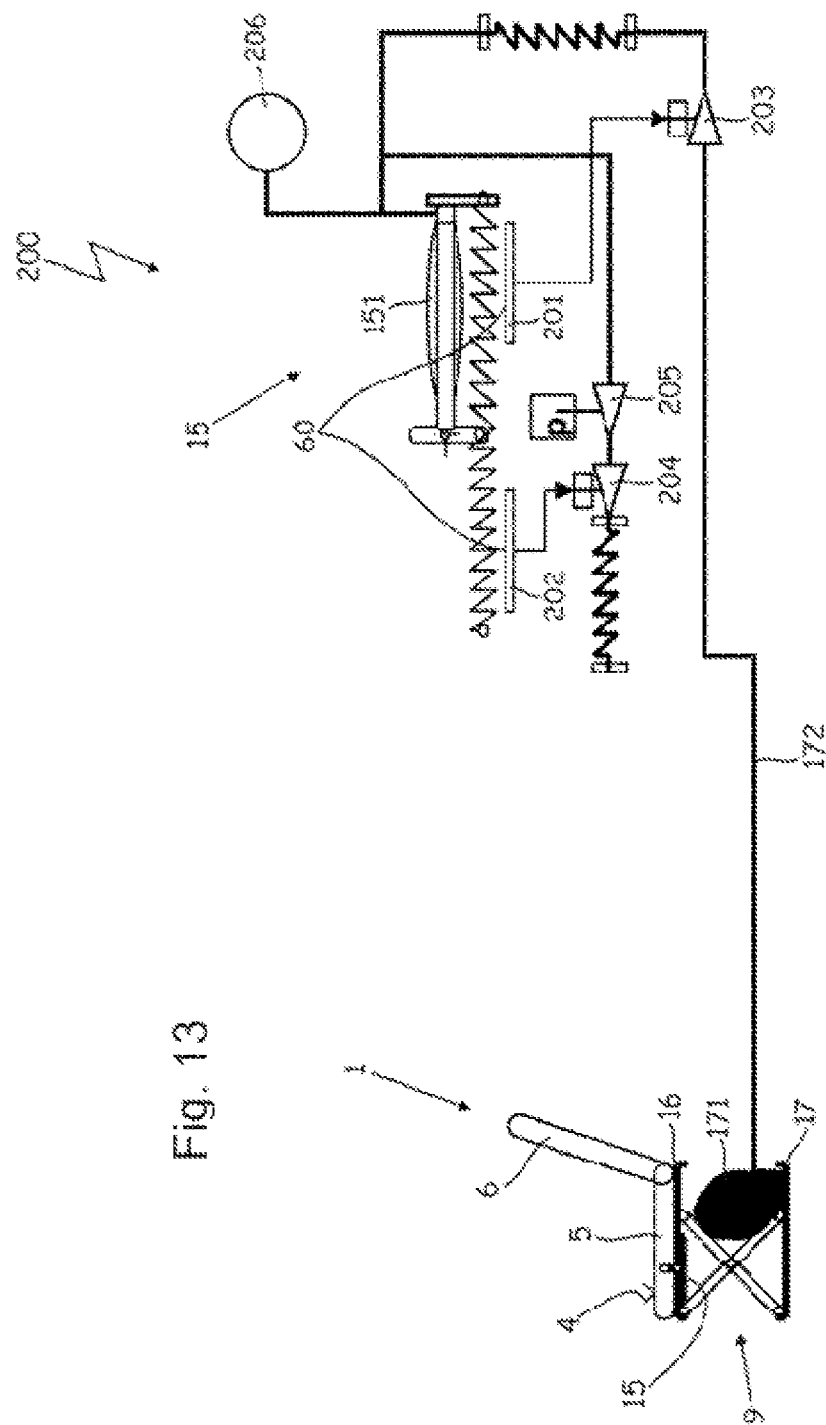
FIG. 13 is a schematic diagram of a possible optimisation device for the horizontal suspension device.

An optimisation device 200 for a pneumatic suspension element 151 which is mounted in a corresponding bearing and deformation device 22 is described in relation to FIG. 13.

The optimisation device 200 can be supplied with a fluid by the fluid reservoir 171 via the fluid connecting line 172, an alternative zero position correction unit 60 being able to comprise a first and a second proportional slide valve element 201 and 202, so as to be able to undertake a horizontal zero position correction or respectively level regulation more pneumatically independently of the pneumatic suspension element 151.

The first proportional slide valve element 201 is connected to the fluid connecting line 172 by means of a first pressure valve 203, and the second proportional slide valve element 202 is connected to the fluid connecting line 172 by means of a second pressure valve 204, a residual-pressure pressure valve 205 further being assigned to the second pressure valve 204 in such a way that the residual pressure in the bellows can be maintained and roll formation can be ensured.

Further, as well as the fluid reservoir 171, the optimisation device 200 further comprises a further additional fluid volume 206, by means of which in particular a weak characteristic or respectively the progressivity in relation to level regulation can be achieved.

An initial position correction can be determined in accordance with an analysis of the degree of adjustment for a seat-part-side upper part 16 and an oscillation isolation for uphill or downhill travel in such a way, position compensation as a first step leading to a major improvement in uphill travel, since for uphill travel the driver is supported by the backrest part 6. In this respect, the driver does not slide off the seat surface 4 and there is thus no support by way of the driver's legs, and thus also no correction to the horizontal suspension initial position, which is taken on by the driver during downhill travel since he would otherwise slide off the seat surface 4.

For the seventh alternative configuration 300, shown in FIGS. 14A and 14B, of another coupling device 301, a deformable suspension element 21 (see for example FIG. 11) is in turn configured as a pneumatic suspension element 151.

On the one hand, the pneumatic suspension element 151 is articulated to the seat-part-side upper part 16 of the horizontal oscillation device 15 by means of a lever arm element 302 via a rotary bearing 303 (see for example FIG. 2A). On the other hand, it is firmly screwed to the body-side lower part 16, or vice versa.

The lever arm element 302 is fixed to the pneumatic suspension element 151 using a firm screw connection (not explicitly shown here), in such a way that a deflection of the seat-part-side upper part 16 with respect to the body-side lower part 17, or vice versa, is only possible as a result of shearing or respectively deformation of the pneumatic suspension element 151, as can clearly be seen from the three drawings arranged above one another in FIG. 14A.

In this context, the rotary bearing makes compensation possible in relation to the change in length during the deformation of the pneumatic suspension element 151.

Thus, a suspension or respectively a zero position correction can be achieved in the horizontal suspension direction 26.

The pneumatic suspension element 151 can be supplied by a fluid reservoir 171 and/or a compressor 175 via a fluid connecting line 172, an air inlet and outlet valve 173 comprising a throttle element 174 further being integrated into the fluid connecting line 172.

In addition, the following also applies to the seventh alternative configuration 300:

The pneumatic suspension element 151 has the aim of aligning itself longitudinally with increasing pressure. If, as in the drawings shown, it is fixed at the end points 304 and 305, only shear forces occur during the deformation of the pneumatic suspension element 151. Unlike shear forces due to deflection, these can be controlled by applying pressure.

Shearing of the pneumatic suspension element 151 is easier when no or respectively little pressure is applied to the pneumatic suspension element 151, since there is a lower spring constant. In horizontal, resting operation, a weak spring characteristic for oscillation isolation is expedient for both light and heavy drivers.

With increasing deflection, or respectively else with increasing driver weight, the pressure and thus the counter force of the pneumatic suspension element 151 are increased so as to counter striking against end stops 38 and 39 (see for example FIG. 2D). As a result of this shearing, the pneumatic suspension element 151 is shortened slightly at the height 306 shown, necessitating at least one rotary bearing 303. In addition, the rotary bearing 303 does not apply a transverse load to the remainder of the guidance system.

On the return path, the pressure is released from the pneumatic suspension element 151, in such a way that the restoring force is reduced and escalation due to a rebound is prevented.

It is clear that at least one distance measurement system (not shown), and under some circumstances also an acceleration measurement system (not shown here), are necessary for this purpose so as to detect the currently occurring excitation simultaneously with the current position in the spring excursion.

Long-term deviation from the central rest position or respectively deflection from the horizontal zero position 30, for example in the case of operation during ascents or descents, can be countered by continuous pressure build-up (rising spring characteristic), in turn making it possible to ensure a sufficient spring excursion.

The form and consistency of the pneumatic suspension element 151 mean that an additional progression can be induced in the spring characteristic in the case of shearing or respectively a pressure rise.

A further progression of the spring characteristics can ideally be achieved by way of a further movement restriction in the rotary bearing, if the resulting extension acts as a further increase of force in the deflection by shortening the pneumatic suspension element 151 in the event of a rise in pressure.

In this case too, contact faces may additionally be provided for the pneumatic suspension element 151, so as to implement an additional increase in force.

It will be appreciated that the embodiments described above are merely first configurations of the vehicle seat according to the invention. The configuration of the invention is therefore not limited to these embodiments.

All of the features disclosed in the application documents are claimed as being essential to the invention if they are novel with respect to the prior art individually or in combination.

LIST OF REFERENCE NUMERALS

1 vehicle seat
2 vehicle
3 forward travel direction
4 seat surface
5 seat part
6 backrest part
7 steering wheel
8 armrest
9 seat substructure
10 body
11 actuation lever
12 wheels
13 ground surface
14 imaginary horizontal plane
15 horizontal suspension device
16 seat-part-side upper part
17 body-side lower part
20 coupling device
21 deformable suspension element
21A first attachment region
21B second attachment region
22 bearing and deformation device
22A mounting region
23 helical suspension element
24 first coupling element
25 further coupling element
26 horizontal suspension direction
29 damping device
30 horizontal zero position
31 front spring excursion
32 rear spring excursion
35 inclined orientation
36 angle of inclination
37 downhill forces 38 front end stop
39 rear end stop
40 force/distance graph
41 x-axis
42 y-axis
43 linear spring characteristic
43A shifted linear spring characteristic
44 operating point
44A corrected operating point
45 residual spring excursion
46 corrective shift
50 coupling point position adjustment unit
51 coupling point
52 linear adjustment device
53 housing element
54 spindle element
55 electric motor
60 zero position correction unit
61 lower part coupling point
65 spring characteristic adaptation unit
66 force/distance graph
70 further possible position adjustment mechanism
71 pendulum device
72 pendulum axis
73 pendulum arm element
74 first end
75 pendulum weight element
76 other end
77 pendulum rotational movement
78 deflected pendulum position
79 vertical pendulum position
90 first alternative configuration
91 further coupling device
92 receiving space
94 first contact face
95 second contact face
96 lateral edge regions
97 further coupling point position adjustment unit
98 slide guide
99 slide block element
100 slide groove
101 coupling point
102 lower part coupling point
105 second alternative configuration
106 further coupling device
107 further coupling point position adjustment unit
108 fork element
109 first end
110 second end
111 first coupling point
112 second coupling point
115 force/distance graph
116 force/distance graph
117 progressive spring characteristic
117A shifted progressive spring characteristic
118 corrective shift
120 third alternative configuration
121 further coupling device
122 other coupling point position adjustment unit
123 rotary bearing
123A first coupling point
124 linear bearing
124A second coupling point
125 curved path
126 transverse displacement component
127 progressive spring characteristic
127A altered progressive spring characteristic
127B displaced and altered progressive spring characteristic
130 force/distance graph
131 corrective shift
140 fourth alternative configuration
141 further coupling device
142 coupling point position adjustment unit
143 coupling point
150 fifth alternative configuration
151 pneumatic suspension element
160 sixth alternative configuration
161 further coupling device
170 fluid supply device
171 fluid reservoir
172 fluid connecting line
173 air inlet and outlet valve
174 throttle element
175 compressor
180 force/distance graph
181 force/distance graph
182 progressive spring characteristic
182A altered progressive spring characteristic
183 corrective shift
200 optimisation device
201 first proportional slide valve element
202 second proportional slide valve element
203 first pressure valve
204 second pressure valve
205 residual pressure valve
206 additional fluid volume
300 seventh alternative configuration
301 other coupling device
302 lever arm element
303 rotary bearing
304 upper end point
305 lower end point
306 height
a acceleration
s linear adjustment
X vehicle longitudinal direction
Y vehicle transverse direction
Z vehicle vertical direction

What is claimed is:

1. A vehicle seat comprising:
a seat part extending in the vehicle longitudinal direction (X) and in the vehicle transverse direction (Y) for receiving a person, the seat part including a backrest part for supporting a back of the person, and
a seat substructure for at least one of suspending or damping at least the seat part with respect to a body of a vehicle,
wherein the seat substructure is connected to the body of the vehicle, wherein the seat substructure includes at least one horizontal suspension device for suspending the seat part with respect to the body in the vehicle longitudinal direction (X) and/or in the vehicle transverse direction (Y),
wherein the at least one horizontal suspension device includes a body-side lower part and a seat-part-side upper part displaceable with respect to the body-side lower part,
wherein a coupling device is arranged interactively between the seat-part-side upper part and the body-side lower part,
wherein the coupling device comprises a deformable suspension element as a first coupling element and a bearing and deformation device as a further coupling element, wherein the deformable suspension element is arranged between two mutually facing contact faces of a receiving space of the bearing and deformation device, and the bearing and deformation device is coupled to the body-side lower part, wherein each end of the first coupling element is connected to a member such that a distance between each end of the first coupling element is fixed, and the first coupling element and the member are arranged displaceably via a coupling point position adjustment unit with respect to a shared upper part coupling point between the coupling point adjustment unit and the seat-part-side upper part, wherein, in a first position, the first coupling element is a first distance from the coupling point and the first coupling element exerts a first force on the further coupling element, and wherein, in a second position, the first coupling element is a second distance from the coupling point, the horizontal suspension device is in a horizontal zero position, and the first coupling element exerts a second force on the further coupling element.

2. The vehicle seat according to claim 1, wherein the further coupling element is arranged relatively displaceably with respect to and on the body-side lower part.

3. The vehicle seat according to claim 1, wherein the first coupling element and the seat-part-side upper part are coupled to one another at the shared upper part coupling point in such a way that a position of the upper part coupling point can be set variably with respect to the seat-part-side upper part.

4. The vehicle seat according to claim 1, wherein the further coupling element and the body-side lower part are coupled to one another at a shared lower part coupling point in such a way that a position of the lower part coupling point can be set variably with respect to the body-side lower part.

5. The vehicle seat according to claim 1, wherein the coupling device comprises a spring characteristic adaptation unit for adapting a spring characteristic of the deformable suspension element, the first coupling element and the seat-part-side upper part being coupled to one another at the shared upper part coupling point in such a way that a position of the upper part coupling point can be set variably with respect to the seat-part-side upper part.

6. The vehicle seat according to claim 1, wherein the coupling device comprises a spring characteristic adaptation unit for adapting the spring characteristic of the deformable suspension element, the further coupling element and the body-side lower part being coupled to one another at a shared lower part coupling point in such a way that a position of the lower part coupling point can be set variably with respect to the body-side lower part.

7. The vehicle seat according to claim 1, wherein the coupling device comprises a mechanically or pneumatically operating adjustment device for displacing the coupling point with respect to the seat-part-side upper part.

8. The vehicle seat according to claim 1, wherein one of the coupling elements is arranged on the seat-part-side upper part or on the body-side lower part both in a stationary manner by way of an attachment region and displaceably by means of a coupling point which is displaceable with respect to the seat-part-side upper part or the body-side lower part.

9. The vehicle seat according to claim 3, wherein a zero position correction unit and/or a spring characteristic adaptation unit are arranged between the first coupling element and the seat-part-side upper part such that the first coupling element is operatively connected to the seat-part-side upper part by the zero position correction unit or the spring characteristic adaptation unit.

10. The vehicle seat according to claim 3, wherein a zero position correction unit and/or the spring characteristic adaptation unit comprise a frequency selection unit so as to be able to distinguish higher-frequency external excitations from simple inclination impulses.

11. A motor vehicle or a utility vehicle comprising a passenger compartment and a vehicle seat arranged therein for receiving a passenger, characterised in that the motor vehicle or the utility vehicle comprises a vehicle seat according to claim 1.

12. The vehicle seat according to claim 1, wherein the member is a fork element having arms that are operatively connected to both ends of the deformable suspension element.

13. The vehicle seat according to claim 12, wherein the coupling point position adjustment unit comprises a housing element connected to the fork element, a spindle displaceable with respect to the housing element, and a motor connected to the spindle and configured to displace the spindle with respect to the housing element.

14. The vehicle seat according to claim 1, wherein the deformable suspension element is a helical spring.

15. The vehicle seat according to claim 1, wherein the seat-part-side upper part is equally spaced between a front end stop and a back end stop when the horizontal suspension device is in the horizontal zero position.

16. A vehicle seat comprising:
a seat part for receiving a person;
a seat substructure connected to the seat part and a body of a vehicle, the seat substructure having at least one suspension device for suspending the seat part with respect to the body in at least one direction;
a coupling device connected to a lower part and an upper part of the at least one suspension device, the coupling device having:
a bearing device connected to the lower part of the at least one suspension device, the bearing device having a receiving space with two contact faces;
a deformable suspension element arranged between the two contact faces of the receiving space of the bearing device, the deformable suspension element having two ends;
a coupling point position unit directly connected to each end of the deformable suspension element, and the coupling point position unit connected to the upper part of the at least one suspension device at a coupling point, wherein the coupling point position unit is configured to displace the deformable suspension element relative to the coupling point;
wherein, in a first position, the deformable suspension element is a first distance from the coupling point and the deformable suspension element has a spring characteristic; and
wherein, in a second position, the deformable suspension element is a second distance from the coupling point and the deformable suspension element has the same spring characteristic, and the horizontal suspension device is in a horizontal zero position such that the upper part of the at least one suspension device is equally spaced between a front end stop and a back end stop of the seat substructure.

17. The vehicle seat of claim 16, wherein the coupling point position unit has a fork with arms connected to each end of the deformable suspension element such that a distance between the ends of the deformable suspension element remains constant.

18. The vehicle seat according to claim 1, wherein the first force is equal to the second force.

* * * * *